(12) United States Patent
Shida et al.

(10) Patent No.: US 9,734,718 B2
(45) Date of Patent: Aug. 15, 2017

(54) VEHICLE LOCATION ESTIMATION APPARATUS AND VEHICLE LOCATION ESTIMATION METHOD

(71) Applicants: Mitsuhisa Shida, Fuji (JP); Tomoyuki Doi, Gotemba (JP)

(72) Inventors: Mitsuhisa Shida, Fuji (JP); Tomoyuki Doi, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 85 days.

(21) Appl. No.: 14/647,985

(22) PCT Filed: Nov. 28, 2013

(86) PCT No.: PCT/IB2013/002653
§ 371 (c)(1),
(2) Date: May 28, 2015

(87) PCT Pub. No.: WO2014/083410
PCT Pub. Date: Jun. 5, 2014

(65) Prior Publication Data
US 2015/0294571 A1 Oct. 15, 2015

(30) Foreign Application Priority Data
Nov. 30, 2012 (JP) .................. 2012-262379

(51) Int. Cl.
*G01C 21/26* (2006.01)
*G08G 1/16* (2006.01)
*H04L 29/08* (2006.01)

(52) U.S. Cl.
CPC ............. *G08G 1/167* (2013.01); *G01C 21/26* (2013.01); *G08G 1/161* (2013.01); *H04L 67/12* (2013.01)

(58) Field of Classification Search
None
See application file for complete search history.

(56) References Cited

U.S. PATENT DOCUMENTS

2003/0225519 A1* 12/2003 Miyahara ........... B60K 31/0008
701/301
2007/0043502 A1 2/2007 Mudalige et al.
(Continued)

FOREIGN PATENT DOCUMENTS

JP 2005-115637 A 4/2005
JP 2007-095038 A 4/2007
(Continued)

*Primary Examiner* — Truc M Do
*Assistant Examiner* — Jess Whittington
(74) *Attorney, Agent, or Firm* — Sughrue Mion, PLLC

(57) ABSTRACT

An azimuth of the direction of travel of the host vehicle is acquired, a radius of the road on which the host vehicle is traveling is estimated, a location of another vehicle is acquired, an azimuth of the direction of travel of the other vehicle is acquired, the other vehicle is positioned on a coordinate system, an origin of which is the host vehicle, and an axis of which is the estimated road radius in the direction of travel of the host vehicle, and determination is made on whether or not the other vehicle is on the same course as the host vehicle by taking account of the width of the course, location error, azimuth error, error in the estimated road radius, error due to drift of the vehicle, and change in the curvature of the course.

17 Claims, 11 Drawing Sheets

(56) References Cited

U.S. PATENT DOCUMENTS

| | | | |
|---|---|---|---|
| 2011/0190972 A1* | 8/2011 | Timmons | G01C 21/34 701/31.4 |
| 2011/0257885 A1* | 10/2011 | Tuck | G01C 21/30 701/472 |
| 2016/0203374 A1* | 7/2016 | Zeng | G01S 13/726 382/104 |
| 2016/0221493 A1* | 8/2016 | Okamoto | B60Q 1/26 |

FOREIGN PATENT DOCUMENTS

| JP | 2007-126086 A | 5/2007 |
|---|---|---|
| JP | 2010-146177 A | 7/2010 |

* cited by examiner

VEHICLE LOCATION ESTIMATION APPARATUS AND VEHICLE LOCATION ESTIMATION METHOD

BACKGROUND OF THE INVENTION

1. Field of the Invention

The invention relates to a vehicle location estimation apparatus which estimates whether another vehicle in the periphery of a host vehicle is traveling on the same course as the host vehicle.

2. Description of Related Art

Technology is available in which information about other vehicles is acquired using vehicle-to-vehicle communications, and this information about other vehicles is used to assist driving in various ways, and so on. Since vehicle-to-vehicle communications are not yet widely used, it is necessary to ascertain with which other vehicle vehicle-to-vehicle communications are being conducted. Of the other vehicles with which vehicle-to-vehicle communications are being conducted, other vehicles traveling in the same direction on the same road (lane) as the host vehicle are especially important, and it is necessary to determine if these other vehicles are on the same course. Japanese Patent Application Publication No. 2005-115637 (JP 2005-115637A) discloses mapping locations indicated by forward vehicle information acquired from a radar, and forward vehicle information acquired from a vehicle-to-vehicle communications apparatus, to a mapping region established with reference to a host vehicle. The Japanese Patent Application Publication No. 2005-115637 also discloses identifying, from among the mapped vehicle locations, a vehicle location, which is closer than a prescribed distance and which has a high degree of matching in respect of the direction of travel, as a position of another vehicle existing in the vicinity of a host vehicle. Furthermore, Japanese Patent Application Publication No. 2010-146177 (JP 2010-146177A) and Japanese Patent Application Publication No. 2007-95038 (JP 2007-95038A) disclose using the travel trajectory of another vehicle conducting vehicle-to-vehicle communications to determine whether or not the other vehicle is on the same course.

Conventionally, in order to determine whether or not another vehicle is on the same course as the host vehicle, a highly accurate other vehicle location and map have been required, and the trajectory already travelled by the other vehicle has also been required. In particular, in the case of a map, preparing the road data is a huge burden and involves problems such as delays in updating the data, and so on. Furthermore, when the location of the other vehicle is mapped with reference to the host vehicle, as disclosed in JP 2005-115637A, then since that map is created on an experimental and empirical basis, it is very difficult indeed to adapt the map when there is a change in the travel scenario, installed sensors, and the like. Therefore, it has not been possible to determine whether or not the other vehicle is traveling on the same course, using simple equipment.

SUMMARY OF THE INVENTION

The present invention is to provide a vehicle location estimation apparatus and vehicle location estimation method which can determine whether or not another vehicle is on the same course as a host vehicle, using simple equipment.

The vehicle location estimation apparatus according to a first aspect of the invention is a vehicle location estimation apparatus for estimating a location of another vehicle in the periphery of a host vehicle, the vehicle location estimation apparatus including: an azimuth acquisition device that acquires an azimuth of a direction of travel of the host vehicle; a road radius estimation device that estimates a radius of a road on which the host vehicle is traveling; an other vehicle location acquisition device that acquires the location of another vehicle; an other vehicle azimuth acquisition device that acquires an azimuth of the direction of travel of the other vehicle; and a determination device that arranges the other vehicle on a coordinate system, an origin of which is a position of the host vehicle, and an axis of which is the radius of the road estimated by the road radius estimation device in the direction of travel of the host vehicle, and that determines whether or not a course on which the other vehicle is travelling is the same as a course on which the host vehicle is travelling, by taking account of a width of a course, error in the acquired location of the other vehicle, error in the estimated road radius, change in a curvature of the course, azimuth error of the host vehicle and the other vehicle, and error due to drift of the host vehicle and the other vehicle.

The vehicle location estimation apparatus according to the first aspect of the present invention further may include: a travel trajectory acquisition device that acquires a travel trajectory of the host vehicle; and a travel distance acquisition device that acquires a travel distance of the host vehicle along the travel trajectory of the host vehicle, wherein, when determining whether or not a course on which the other vehicle is travelling in the rear of the host vehicle is the same as a course on which the host vehicle is travelling, the determination device arranges the other vehicle on a coordinate system, an origin of which is a position of the host vehicle, and an axis of which is the travel trajectory of the host vehicle in the rear of the host vehicle, and determines whether or not the course on which the other vehicle in the rear of the host vehicle is the same as the course on which the host vehicle is travelling, by taking account of the width of the course, error in the acquired location of the other vehicle, and drift error per travel distance on the travel trajectory.

The vehicle location estimation apparatus according to the first aspect of the present invention further may include: a location detection device that detects an absolute location of the host vehicle; and a coordinates conversion device that implements conversion from a coordinate system based on the absolute location to a relative coordinate system, the origin of which is the position of the host vehicle; wherein an object of same-course determination is the other vehicle which is in vehicle-to-vehicle communications with the host vehicle, the azimuth acquisition device acquires the absolute azimuth of the host vehicle, the other vehicle location acquisition device acquires the absolute location of the other vehicle by vehicle-to-vehicle communications, the other vehicle azimuth acquisition device acquires the absolute azimuth of the other vehicle by vehicle-to-vehicle communications, and the coordinates conversion device converts the absolute location and the absolute azimuth of the other vehicle to the relative coordinate system, the origin of which is the position of the host vehicle.

The vehicle location estimation apparatus according to the first aspect of the present invention further may include: a camera that captures an image of the periphery of the host vehicle; a lane detection device that detects a lane in which the host vehicle is traveling on the basis of the image captured by the camera; a curvature calculation device that calculates a curvature of the lane detected by the lane detection device; and a curvature change calculation device which calculates change in the curvature calculated by the curvature calculation device; wherein the determination device determines whether or not the course on which the other vehicle is travelling is the same as the course on which the host vehicle is travelling, by using the curvature calculated by the curvature calculation device and the change in the curvature calculated by the curvature change calculation device.

The vehicle location estimation apparatus according to the first aspect of the present invention further may include: a vehicle speed detection device that detects a speed of the host vehicle; a free flow judgment device that judges whether or not the host vehicle is traveling in free flowing traffic; and a road alignment estimation device that estimates a road alignment corresponding to the vehicle speed detected by the vehicle speed detection device, when the free flow judgment device judges that the host vehicle is traveling in free flowing traffic; wherein the determination device determines whether or not the course on which the other vehicle is travelling is the same as the course on which the host vehicle is travelling by using the road alignment estimated by the road alignment estimation device.

In the vehicle location estimation apparatus according to the first aspect of the present invention, the road alignment estimation device may record the vehicle speed detected by the vehicle speed detection device each time the free flow judgment device judges that the host vehicle is traveling in free flowing traffic, and estimates the road alignment corresponding to the vehicle speed recorded the last time that the free flow judgment device judged the host vehicle to be traveling in free flowing traffic, when the free flow judgment device judges that the host vehicle is not traveling in free flowing traffic.

The vehicle location estimation apparatus according to the first aspect of the present invention may further include a time-between-vehicles acquisition device that acquires a time between the host vehicle and the other vehicle travelling in front of the host vehicle, wherein the free flow judgment device judges whether or not the host vehicle is traveling in free flowing traffic on the basis of the vehicle speed detected by the vehicle speed detection device and the time between vehicles acquired by the time-between-vehicles acquisition device.

In the vehicle location estimation apparatus according to the first aspect of the present invention, the determination device may set a location threshold value and an azimuth threshold value, and determine whether or not the course on which the other vehicle is travelling is the same as the course on which the host vehicle is travelling, by comparing the location of the other vehicle with the location threshold value, and also comparing the azimuth of the other vehicle with the azimuth threshold value.

In the vehicle location estimation apparatus according to the first aspect of the present invention, the determination device may set a course range of the host vehicle and a course range of the other vehicle, and determine whether or not the course on which the other vehicle is travelling is the same as the course on which the host vehicle is travelling on the basis of the range of overlap between the course range of the host vehicle and the course range of the other vehicle.

In the vehicle location estimation apparatus according to the first aspect of the present invention, the determination device determines whether or not the course on which the other vehicle is travelling is the same as the course on which the host vehicle is travelling, by using the course ranges of a plurality of other vehicles.

A second aspect of the present invention provides a vehicle location estimation method for estimating a location of another vehicle in the periphery of a host vehicle, the vehicle location estimation method including: acquiring an azimuth of a direction of travel of the host vehicle; estimating a radius of a road on which the host vehicle is traveling; acquiring the location of another vehicle; acquiring an azimuth of the direction of travel of another vehicle; arranging another vehicle in front of the host vehicle on a coordinate system, an origin of which is a position of the host vehicle, an axis of which is a radius of the road in the direction of travel of the host vehicle; and determining whether or not a course on which the other vehicle is travelling is the same as a course on which the host vehicle is travelling, by taking account of a width of a course, error in the acquired location of the other vehicle, error in the estimated road radius, change in a curvature of the course, azimuth error of the host vehicle and the other vehicle, and error due to drift of the host vehicle and the other vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 8A to 8C are examples of the relationship between the vehicle speed and the road alignment, wherein FIG. 8A shows a case where the vehicle is traveling in free flowing traffic, and the vehicle speed is 100 km/h, FIG. 8B shows a case where the vehicle is traveling in free flowing traffic and the vehicle speed is 40 km/h, and FIG. 8C shows a case where the vehicle is not traveling in free flowing traffic and the vehicle speed is 40 km/h;

DETAILED DESCRIPTION OF EMBODIMENTS

Figure 1:
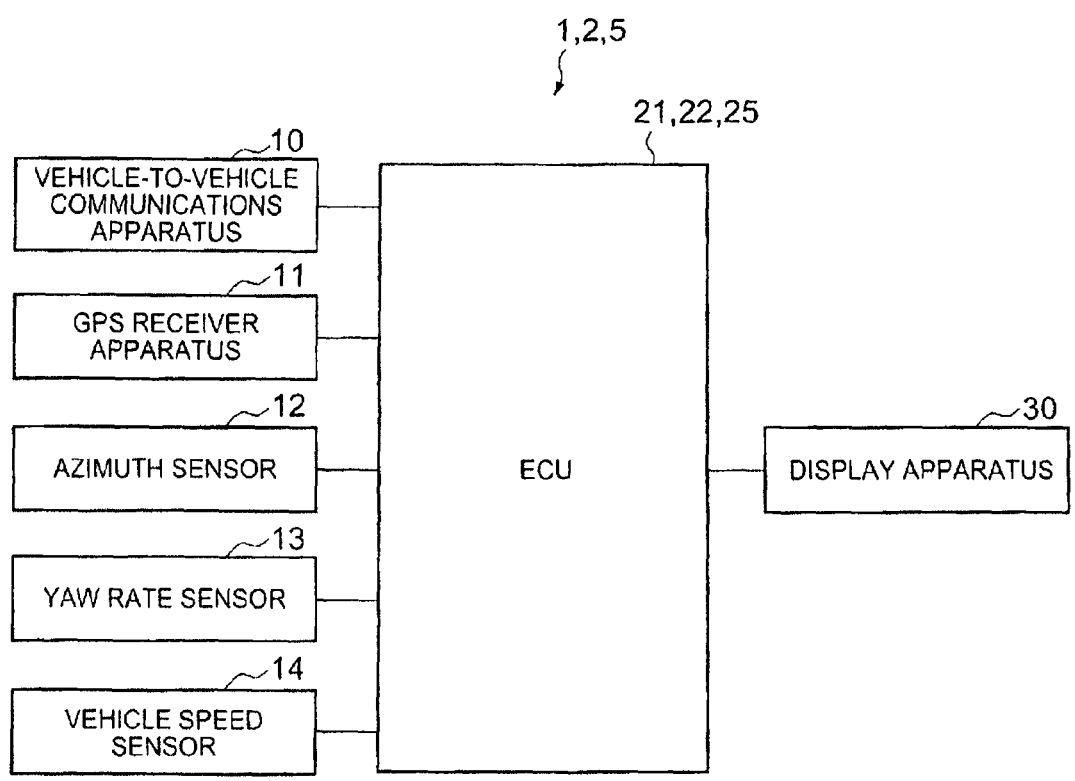
FIG. 1 is a schematic drawing of a vehicle location estimation apparatus relating to a first, second and fifth embodiment of the invention.

Below, an embodiment of a vehicle location estimation apparatus relating to the invention will be described with reference to the drawings. Elements which are the same or corresponding in the respective drawings are labeled with the same reference numerals, and repeated description thereof is omitted.

In the embodiment, the vehicle location estimation apparatus relating to the invention is applied to a vehicle location estimation apparatus mounted in a vehicle having a vehicle-to-vehicle communications function, the object being to determine whether another vehicle conducting vehicle-to-vehicle communications is on the same course. Respective vehicles on which the vehicle location estimation apparatus relating to the embodiment is mounted communicate with other vehicles situated within a range that permits vehicle-to-vehicle communications, and each acquire various information from these other vehicles. The vehicle location estimation apparatus relating to the embodiment respectively determines whether or not a course on which the other vehicle is traveling is the same as a course on which the host vehicle is travelling, in respect of each of the other vehicles from which information can be acquired by vehicle-to-vehicle communications, and displays the other vehicle on the same course which is conducting vehicle-to-vehicle communications, to the driver. The determination object in this same-course determination is another vehicle which is traveling on the same road and in the same direction as the host vehicle. The vehicle location estimation apparatus may be a dedicated apparatus which only performs same-course determination and notification of the driver, or may be an apparatus which is incorporated as one function in a vehicle-to-vehicle communications system or various driving assistance systems.

There are five modes in the embodiments: the first embodiment is a fundamental mode relating to a determination method; the second embodiment is a mode relating to a determination method in which the determination accuracy on the rear side of the host vehicle is improved in the determination method of the first embodiment; the third embodiment is a mode based on the second embodiment, in which the determination accuracy is improved by using recognition results from a white line recognition camera; the fourth embodiment is a mode based on the second embodiment, in which the determination accuracy is improved by using a road alignment corresponding to a vehicle speed in free flowing traffic; and the fifth embodiment is a mode relating to a determination method which is different to the basic determination method.

Incidentally, since the dissemination rate of vehicle-to-vehicle communications is still low, then even if a large number of vehicles are situated in the periphery of the host vehicle, only a portion of the other vehicles have a vehicle-to-vehicle communications function. Consequently, there are cases where another vehicle conducting vehicle-to-vehicle communications is situated distantly, on the other side of a plurality of vehicles, and cases where the other vehicle conducting vehicle-to-vehicle communications is situated in close proximity. Furthermore, since the host vehicle is able to communicate with all of the other vehicles having a vehicle-to-vehicle communications function in the periphery of the host vehicle, in a case where they are within a range permitting vehicle-to-vehicle communications, then the host vehicle communicates also with other vehicles which do not affect the travel of the host vehicle, such as a vehicle in an opposite lane, a vehicle in a higher or lower deck of an elevated roadway, and the like. Consequently, it is necessary to determine other vehicles traveling on the same course (on the same road and in the same direction of travel), as other vehicles which have a possibility of affecting the travel of the host vehicle, from among the other vehicles which are conducting vehicle-to-vehicle communications.

Figure 2:
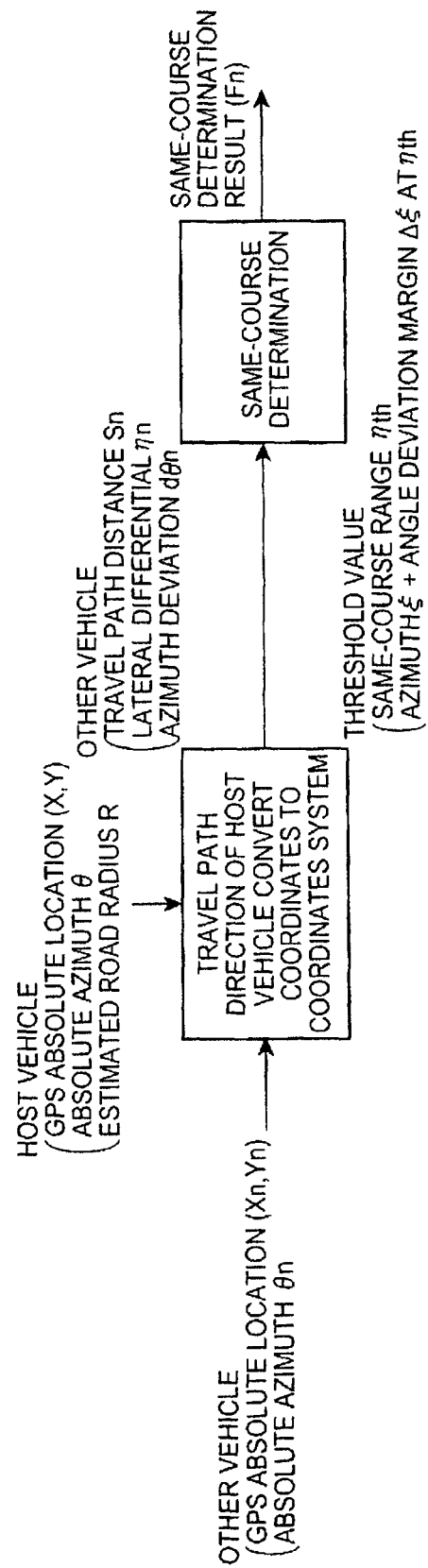
FIG. 2 is a conceptual drawing of a same-course determination method relating to the first embodiment.
Figure 3:
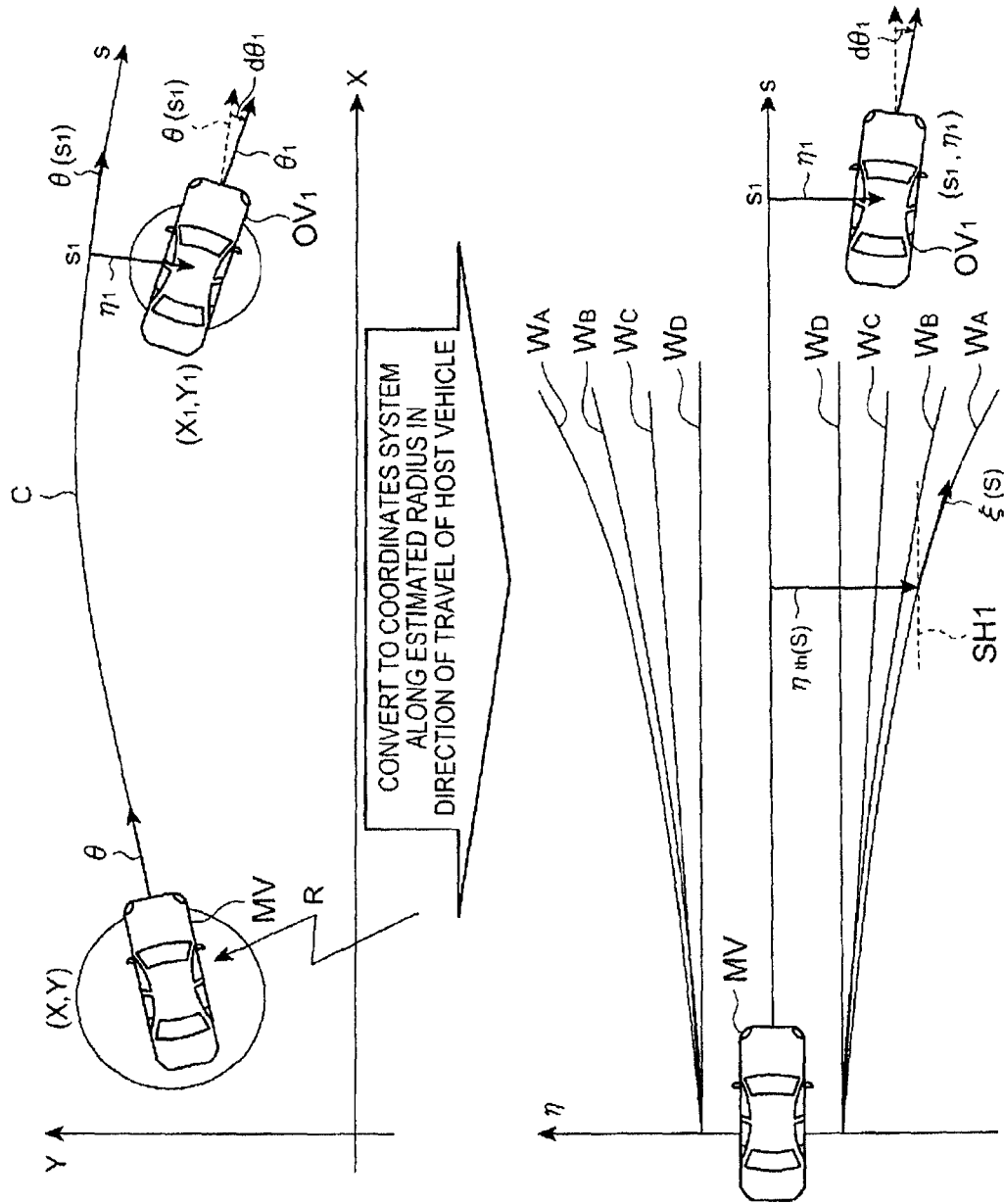
FIG. 3 is an illustrative drawing of a same-course determination method relating to the first embodiment.

The vehicle location estimation apparatus 1 relating to the first embodiment is now described with reference to FIGS. 1 to 3. FIG. 1 is a schematic drawing of the vehicle location estimation apparatus. FIG. 2 is a schematic drawing of a same-course determination method. FIG. 3 is an illustrative diagram of a same-course determination method.

The vehicle location estimation apparatus 1 creates a mathematical formula model of the sensor error, vehicle driving error and change in road curvature, and using a determination threshold value obtained from this mathematical formula model, determines whether or not the other vehicle conducting vehicle-to-vehicle communications is traveling on the same course as the host vehicle. More specifically, the vehicle location estimation apparatus 1 converts the location and azimuth of the other vehicle to a coordinate system (relative coordinates system), an origin of which is the host vehicle, and an axis of which is the travel path direction of the course of the host vehicle, sets threshold values for the lateral position and the azimuth taking account of the width of the course, the sensor error (relative location error of the GPS, azimuth error, estimated road radius error), driving error (azimuth error and estimated road radius (curvature) error due to deviation of the vehicle), and change in the curvature of the course. The vehicle location estimation apparatus 1 carries out same-course determination by comparing the converted location and azimuth with the threshold values.

FIG. 2 shows an overview of this same-course determination method. In the vehicle location estimation apparatus 1, the absolute location (X,Y) and the absolute azimuth $\theta$ are acquired from the GPS of the host vehicle, and the road radius R is estimated from the yaw rate and the vehicle speed. Furthermore, in the vehicle location estimation apparatus 1, the GPS absolute location $(X_n,Y_n)$ and the absolute azimuth $\theta_n$ are acquired for each other vehicle n (n=1, 2, ... ) by vehicle-to-vehicle communications. In the vehicle location estimation apparatus 1, for each other vehicle n, the GPS absolute location and absolute azimuth for that other vehicle n are converted to a coordinate system based on the travel path direction of the course of the host vehicle, and in this coordinate system, the travel path distance $s_n$ to the other vehicle n, the lateral differential from the travel path (deviation in the lateral position from the travel path of the course of the host vehicle) $\eta_n$, and the azimuth deviation, $d\theta_n$, from the tangential direction to the travel path are obtained. Furthermore, in the vehicle location estimation apparatus 1, a same-course range (a threshold value with respect to the lateral differential) $\eta_{th}$ and an azimuth $\xi$ in that range $\eta_{th}$ are calculated at the travel path distance $s_n$ of the other vehicle n, by a mathematical formula model which takes account of the width of the course, the GPS relative location error, the azimuth error, the estimated road radius error, the error due to drift of the vehicle, and the change in the curvature of the road, and the threshold value $\eta_{th}$ relating to the lateral differential and "a threshold value $\xi+\Delta\xi$ (an angular deviation margin) relating to the azimuth deviation" are obtained. The vehicle location estimation apparatus 1 then determines whether or not the other vehicle is on the same course, by comparing the lateral differential $\eta_n$ and the threshold value $\eta_{th}$, and also comparing the azimuth deviation $d\theta_n$ and "the threshold value $\xi+\Delta\xi$", and thereby obtains a determination result $F_n$.

The vehicle location estimation apparatus 1 is provided with a vehicle-to-vehicle communications apparatus 10, a GPS receiver apparatus 11, an azimuth sensor 12, a yaw rate sensor 13, a vehicle speed sensor 14, an electronic control unit (ECU) 21, and a display apparatus 30. In the first embodiment, the vehicle-to-vehicle communications apparatus 10 of the first embodiment may be regarded as the other vehicle location acquisition device and the other vehicle azimuth acquisition device in the present invention, the GPS receiver apparatus 11 of the first embodiment may regarded as the position acquisition device of the present invention, the azimuth sensor 12 of the first embodiment may be regarded as the azimuth acquisition device of the present invention, processing performed by the yaw rate sensor 13, the vehicle speed sensor 14 and the ECU 21 of the first embodiment may be regarded as the road radius estimation device of the present invention, and the ECU 21 of the first embodiment may be regarded the coordinates conversion device and the determination device of the present invention.

The vehicle-to-vehicle communications apparatus 10 is an apparatus for communicating with another vehicle having a vehicle-to-vehicle communications function in the periphery of the host vehicle, and includes a communications antenna and a processing apparatus. In the vehicle-to-vehicle communications apparatus 10, a vehicle-to-vehicle communications signal is transmitted via the communications antenna from the host vehicle to other vehicles situated in a range permitting vehicle-to-vehicle communications, and furthermore vehicle-to-vehicle communications signals are received from other vehicles situated in the range permitting vehicle-to-vehicle communications. When a vehicle-to-vehicle communications signal is received from another vehicle, the vehicle-to-vehicle communications apparatus 10 demodulates the vehicle-to-vehicle communications signal, extracts information from the other vehicle, and transmits this information to the ECU 21. Furthermore, when sending a vehicle-to-vehicle communications signal to other vehicles, the vehicle-to-vehicle communications apparatus 10 modulates information about the host vehicle from the ECU 21, and transmits this modulated signal from the communications antenna. The information that is transmitted and received in vehicle-to-vehicle communications is, for instance, the absolute location, absolute azimuth, vehicle speed, yaw rate, estimated road radius, and the like.

The GPS receiver apparatus 11 is an apparatus for receiving a GPS signal from a GPS satellite to detect the absolute location of the vehicle, and the like, and includes a GPS antenna and a processing apparatus. The GPS receiver apparatus 11 receives GPS signals from respective GPS satellites via the GPS antenna. In the GPS receiver apparatus 11, the received GPS signals are respectively demodulated, at predetermined time intervals, and the absolute location (for example, the latitude and longitude) of the vehicle are calculated on the basis of the information of the respective demodulated GPS signals, and the information about the absolute location, and the like, is transmitted to the ECU 21.

The azimuth sensor 12 is a sensor which detects the absolute azimuth of the direction of travel of the vehicle (for example, north is set as 0° (360°), and in clockwise fashion, east is 90°, south is 180° and west is 270°). In the azimuth sensor 12, the absolute azimuth is detected at predetermined time intervals and this absolute azimuth is transmitted to the ECU 21. The sensor which detects the absolute azimuth may be, for example, a sensor using the earth's magnetism.

The yaw rate sensor 13 is a sensor for detecting the yaw rate which is acting on the vehicle. In the yaw rate sensor 13, the yaw rate is detected at predetermined time intervals and the detected yaw rate is transmitted to the ECU 21.

The vehicle speed sensor 14 is a sensor for detecting the speed of the vehicle. In the vehicle speed sensor 14, the vehicle speed is detected at predetermined time intervals and the detected vehicle speed is transmitted to the ECU 21. The sensor for detecting the vehicle speed may be, for example, a wheel speed sensor which detects the speed of rotation of a wheel (a number of pulses corresponding to the rotation of the wheel); the wheel speeds are calculated respectively from the number of rotational pulses at each wheel and a vehicle body speed (vehicle speed) is calculated from the speed of each wheel.

The ECU 21 is an ECU constituted by a central processing unit (CPU), a read only memory (ROM), a random access memory (RAM), and the like, and the ECU 21 implements overall control of the vehicle location estimation apparatus 1. In the ECU 21, the information about each other vehicle n (namely, the absolute location $(X_n, Y_n)$, the absolute azimuth $\theta_n$, the yaw rate $\gamma_n$, the vehicle speed $V_n$, the estimated road radius $R_n$, and the like) is acquired from the vehicle-to-vehicle communications apparatus 10, at predetermined time intervals. Furthermore, in the ECU 21, the respective detection information from the GPS receiver apparatus 11, the azimuth sensor 12, the yaw rate sensor 13 and the vehicle speed sensor 14 (namely, the absolute location (X,Y), the absolute azimuth $\theta$, the yaw rate $\gamma$ and the vehicle speed V) is acquired at predetermined time intervals. In the ECU 21, the road radius R $(=\gamma/V)$ is calculated using the acquired yaw rate $\gamma$ and vehicle speed V, and the road curvature $(=1/R)$ is also calculated, at predetermined time intervals. Thereupon; the ECU 21 sends the absolute location (X,Y), absolute azimuth $\theta$, yaw rate $\gamma$, vehicle speed V, estimated road radius R, and the like, to the vehicle-to-vehicle communications apparatus 10, in order to transmits the information about the host vehicle to the other vehicles. Furthermore, for each other vehicle n conducting vehicle-to-vehicle communications, the ECU 21 determines whether or not the other vehicle n is on the same course, by using the acquired information about the other vehicle and the information about the host vehicle. Furthermore, the ECU 21 outputs image information indicating another vehicle which is determined to be on the same course on the basis of this determination result, to the display apparatus 30. This same-course determination process is described in detail below.

Before describing the same-course determination process, the coordinate system used by the ECU 21 will be described with reference to FIG. 3. The coordinate system on the upper side in FIG. 3 is a coordinate system based on the absolute location, in which, for example, the X axis represents longitude and the Y axis represents latitude. In this absolute coordinate system, the host vehicle MV is positioned at the absolute location (X,Y), the direction of travel of the absolute azimuth $\theta$ is indicated, the other vehicle, $OV_1$, in front of the host vehicle MV is positioned at the absolute location $(X_1, Y_1)$, and the direction of travel of the absolute azimuth $\theta_1$ thereof is indicated. The circles at the host vehicle MV and the other vehicle $OV_1$ respectively indicate the GPS relative location error centered on (X,Y) and $(X_1, Y_1)$. The curve C is a curve having the estimated road radius R extending along the absolute azimuth $\theta$ of the direction of travel of the host vehicle, and indicates the estimated travel path of the host vehicle MV. The s on the curve C indicates the travel path distance from the host vehicle MV. $\eta_1$ is the lateral differential (deviation in the lateral position) from the travel path of the host vehicle MV (curve C) to the absolute location $(X_1, Y_1)$ of the other vehicle $OV_1$. $s_1$ is the travel path distance corresponding to the absolute location $(X_1, Y_1)$ of the other vehicle $OV_1$. $\theta(s_1)$ is the absolute azimuth of the travel path direction (the tangential direction to the curve C)

at the travel path distance $s_1$. $d\theta_1$ is the azimuth deviation of the absolute azimuth $\theta_1$ of the other vehicle $OV_1$ from the absolute azimuth $\theta(s_1)$.

Furthermore, the coordinate system in the lower part of FIG. 3 is a coordinate system (a coordinate system in a direction of a travel path of the host vehicle MV, i.e., a coordinate system, an origin of which is a position of the host vehicle, and an axis of which is an estimated road radius in the travelling direction of the host vehicle) based on a relative location with reference to the host vehicle MV along the estimated road radius R (curve C) in the direction of travel (azimuth $\theta$) of the host vehicle, the s axis is the travel path distance, and the $\eta$ axis is the lateral differential. In this relative coordinate system, the host vehicle MV is positioned at the point of origin, the other vehicle $OV_1$ is positioned at $(s_1, \eta_1)$ and the direction of travel of the azimuth deviation $d\theta_1$ is indicated.

Furthermore, the threshold value of the lateral differential and the threshold value of the azimuth used by the ECU 21 will be described with reference to FIG. 3. In the first embodiment, the same-course range with respect to the host vehicle MV (course width) $\eta_{th}(s)$ is represented geometrically by Expression (1), by using the coefficients A, B, C, D described below and taking the travel path distance s as a variable in the s-$\eta$ coordinate system. This value $\eta_{th}(s)$ is the threshold value of the lateral differential at the travel path distance s, and if the lateral differential of the other vehicle comes inside the dotted line SH1 as shown in FIG. 3 ($\eta_{th}(s)$) (on both the left and right sides when making a determination), then the other vehicle is on the same course as the course on which the host vehicle MV is travelling.

[Expression 1]

$$\eta_{th}(s) = As^3 + Bs^2 + Cs + D \quad (1)$$

D[m] in Expression (1) is a coefficient of a zero-order term (a term which takes account of the relative location deviation), and D[m] is a coefficient which takes account of "the sum of the width of the course (road) and the GPS relative location error". This course width is set by taking account of the general width of a course (road), and may be set to a fixed value, but may also be set to a variable value in accordance with the type of road; for example, the course width may be the width of one side of a road corresponding to the number of lanes in a normal roadway, or the width of one side of an expressway, or the width of one side of an urban expressway. The GPS relative location error is set previously in accordance with real vehicle experimentation, or the like, using the GPS receiver apparatus 11. It should be noted that since relative positioning is carried out using GPS signals from a plurality of GPS satellites, in positioning by GPS, then error occurs in the absolute location detected by this relative positioning. D in a zero-order term (which is uniform regardless of the travel path distance s), and the same-course range based on this value D is a uniform range $W_D$ on both the positive side and the negative side of the s axis, as indicated by the s-$\eta$ coordinate system in FIG. 3.

C[rad] in Expression (1) is a coefficient of a first-order term (a term which takes account of the azimuth deviation), and C[rad] takes account of "the sum of the azimuth detection error and the azimuth error due to deviation of the vehicle". The azimuth detection error is set in advance by real vehicle experimentation, and the like, using the azimuth sensor 12. The azimuth error due to deviation of the vehicle is set in advance by real vehicle experimentation, or the like. It should be noted that, since the vehicle deviates when actually traveling, then the actual azimuth of the vehicle varies moment by moment (for example, the azimuth is not uniform even when traveling on a straight path), and error occurs in the azimuth due to this deviation. Cs is a first-order term (which increases in direct proportion to the travel path distance s), and therefore the same-course range which also factors in this Cs value is a range $W_C$ which increases in proportion with the value s from the range $W_D$, as indicated by the s-$\eta$ coordinate system in FIG. 3.

B[1/m] in Expression (1) is a coefficient of a second-order term (a term which takes account of the road curvature deviation), and B[1/m] is a coefficient which takes account of "the sum of the estimation error in the estimated road curvature (the reciprocal of R) and the road curvature error due to deviation of the vehicle". The road radius R is estimated from the yaw rate and the vehicle speed, and the road curvature is calculated from this road radius R. The estimation error in the estimated road curvature is set in advance by real vehicle experimentation using the yaw rate sensor 13 and the vehicle speed sensor 14, and the like. The curvature error due to deviation of the vehicle is set in advance by real vehicle experimentation, or the like. It should be noted that since the vehicle deviates when actually traveling, the radius of the actual travel trajectory of the vehicle changes moment by moment (for example, the radius of the path of travel of the vehicle is not uniform even when traveling along a curve having a uniform road radius), and due to this deviation, error also occurs in the yaw rate, and the like, and error occurs in the estimated road radius. $Bs^2$ is a second-order term (which increases with the square of the travel path distance s), and a same-course range which also factors in this value of $Bs^2$ is the range $W_B$ which increases with the square of the s value, from the range $W_C$, as shown in the s-$\eta$ coordinate system in FIG. 3.

A[1/$m^2$] in Expression (1) is a coefficient of a third-order term (clothoid curve (deviation in rate of change of curvature)), which takes account of an assumed clothoid curve parameter. The assumed clothoid curve parameter is estimated from the road structure, and the like, and may be set to a fixed value, but may also be set to a variable value according to the road type and so on; for example, in the case of an expressway (for example, the Second Tomei Expressway), there are few changes in the curvature (road radius) and the rate of change is also small, and therefore this parameter is set to a small value, whereas in the case of an urban expressway (for example, Metropolitan Expressway) there are many changes in the curvature and the rate of change is also great, so the parameter is set to a large value. It should be noted that in the case of a curving road, as well as roads which curve with a fixed curvature, there are also roads which curve with a changing curvature, and it is necessary to take roads of this kind into account as well. $As^3$ is a third-order term (which increases with the third power of the travel path distance s), and a same-course range which also factors in this value of $As^3$ is the range $W_A$ which increases further with the third power of the s value, from the range $W_B$, as shown in the s-$\eta$ coordinate system in FIG. 3.

If the same-course range is enlarged beyond the required range, then noise is introduced and unwanted other vehicles are determined to be on the same course; whereas any other corresponding vehicle cannot be determined if the range is narrowed. Therefore, the coefficients A, B, C, D must be set to suitable values in order to achieve the determination at a good balance. Stated alternatively, it is possible to set a suitable same-course range simply by setting the coefficients A, B, C and D.

Furthermore, the azimuth $\xi(s)$ at $\eta_{th}(s)$ of any travel path distance s is the angle of the tangential direction at the curve calculated from $\eta_{th}(s)$ and can therefore be calculated by Expression (2). The angle obtained by adding the angle deviation margin $\Delta\xi$ of the vehicle azimuth to this azimuth value $\xi(s)$ is the threshold value for the azimuth at the travel path distance "s". If the azimuth deviation of the other vehicle comes within this azimuth threshold value, then it is considered that the other vehicle is traveling in the same direction as the direction of travel of the host vehicle MV. The angle deviation margin $\Delta\xi$ is set in advance by real vehicle experimentation, and the like, using the azimuth sensor 12. In this way, it is determined whether or not the course on which the other vehicle is traveling is the same as the course on which the host vehicle is travelling, including the direction in which the vehicles are facing. Therefore, vehicles which are on the same course but traveling in the opposite direction or traveling in a different direction can be excluded.

[Expression 2]

$$\xi(s) = \tan^{-1}\left(\frac{d\eta_{th}(s)}{ds}\right) = \tan^{-1}(3As^2 + 2Bs + C) \quad (2)$$

Next, the same-course determination process will be described. For each other vehicle n (n=1, 2, . . . ), the ECU 21 uses the absolute location (X,Y), absolute azimuth $\theta$ and estimated road radius R of the host vehicle, and the absolute location $(X_n, Y_n)$ and absolute azimuth $\theta_n$ of the other vehicle n to convert the absolute location $(X_n, Y_n)$ and absolute azimuth $\theta_n$ of the other vehicle n in an absolute coordinate system, to an s-$\eta$ coordinate system, an origin of which is a position of the hose vehicle, and axis of which is the estimated road radius R in the direction of travel of the host vehicle MV. The ECU 21 then calculates the travel path distance $s_n$, the lateral differential $\eta_n$, the absolute azimuth $\theta(s_n)$ of the travel path direction at the travel path distance $s_n$, and the azimuth deviation $d\theta_n$, for the other vehicle n in this s-$\eta$ coordinate system.

The ECU 21 calculates the threshold value $\eta_{th}(s_n)$ of the lateral differential at the travel path distance $s_n$ of the other vehicle n, by Expression (1). The ECU 21 then uses the lateral differential $\eta_n$ and the lateral differential threshold value $\eta_{th}(s_n)$ of the other vehicle n to determine whether or not the determination condition in Expression (3) is satisfied. If the determination condition in Expression (3) is satisfied, then the ECU 21 judges that the other vehicle n is on the same course as a course on which the host vehicle is travelling. Furthermore, if the determination condition in Expression (3) is not satisfied, then the ECU 21 judges that the other vehicle n is not on the same course as a course on which the host vehicle is travelling.

[Expression 3]

$$\text{abs}(\eta_n) < \eta_{th}(s_n) \quad (3)$$

The ECU 21 then calculates the azimuth $\xi(s_n)$ at the threshold value $\eta_{th}(s_n)$ of the lateral differential at the travel path distance $s_n$ of the other vehicle n, by Expression (2). Thereupon, the ECU 21 uses the azimuth deviation $d\theta_n$ and the azimuth deviation threshold value $\xi(s_n)+\Delta\xi$ of the other vehicle n to determine whether or not the determination condition in Expression (4) is satisfied. If the determination condition in Expression (4) is satisfied, then the ECU 21 judges that the other vehicle n has the same direction of travel as the host vehicle. Furthermore, if the determination condition in Expression (4) is not satisfied, then the ECU 21 judges that the other vehicle n does not have the same direction of travel as the host vehicle.

[Expression 4]

$$\text{abs}(d\theta_n) < \xi(s_n)+\Delta\xi \quad (4)$$

The ECU 21 determines that the course on which the other vehicle n is travelling is the same as the course on which the host vehicle is travelling, if the determination condition in Expression (3) is satisfied and the determination condition in Expression (4) is satisfied (if the other vehicle n is within the same-course range of the host vehicle (on the same course), and has the same direction of travel as the host vehicle). Upon completing the determination described above in respect of all of the other vehicles n conducting vehicle-to-vehicle communications (n=1, 2, . . . ), the ECU 21 generates an image in which other vehicles which have been determined to be on the same course as the course on which the host vehicle are positioned relatively with respect to the host vehicle. The ECU 21 sends this image information to the display apparatus 30.

The same-course determination described above estimates the range of the course to be travelled hereafter by the host vehicle, and therefore provides a determination that is valid in respect of another vehicle situated in front of the host vehicle where the host vehicle is to travel hereafter, but this determination can also be applied to another vehicle situated behind the host vehicle.

The display apparatus 30 is a display monitor, or the like, which displays information of various types. The display apparatus 30 may be, for example, a multi-display in a combination meter, or a display in a navigation system. In the display apparatus 30, when image information indicating another vehicle on the same course is acquired from the ECU 21, that image is displayed.

The operation of the vehicle location estimation apparatus 1 having the composition described above will now be explained. In the vehicle location estimation apparatus 1, the operations indicated below are carried out repeatedly. Another vehicle n having a vehicle-to-vehicle communications function transmits a vehicle-to-vehicle communications signal including information such as an absolute location $(X_n, Y_n)$, absolute azimuth $\theta_n$, yaw rate $\gamma_n$, vehicle speed $V_n$, estimated road radius $R_n$, and the like, by vehicle-to-vehicle communications. It should be noted that these elements of information are also transmitted in a similar fashion from the host vehicle, by vehicle-to-vehicle communications.

When a vehicle-to-vehicle communications signal is received from another vehicle n which is situated in a range permitting vehicle-to-vehicle communications, the vehicle-to-vehicle communications apparatus 10 demodulates the vehicle-to-vehicle communications signal, extracts information from the other vehicle n, and transmits this information to the ECU 21. The ECU 21 acquires information about the other vehicle n from the vehicle-to-vehicle communications apparatus 10.

The GPS receiver apparatus 11 receives GPS signals from respective GPS satellites, respectively demodulates the received GPS signals, calculates an absolute location (X,Y) of the host vehicle on the basis of the information in the demodulated GPS signals, and sends this information to the ECU 21. The azimuth sensor 12 detects the absolute azimuth $\theta$ of the host vehicle and transmits this to the ECU 21. The yaw rate sensor 13 detects the yaw rate $\gamma$ of the host vehicle and transmits this to the ECU 21. The vehicle speed sensor 14 detects the vehicle speed V of the host vehicle and transmits this to the ECU 21. The ECU 21 acquires each of the detected information elements.

For each other vehicle n, the ECU 21 uses the absolute location (X,Y), absolute azimuth θ and estimated road radius R of the host vehicle, and the absolute location $(X_n, Y_n)$ and absolute azimuth $\theta_n$ of the other vehicle n to convert to an s-η coordinate system, an origin of which is a position of the host vehicle MV, and an axis of which is the estimated road radius R in the direction of travel of the host vehicle MV, and respectively calculates the travel path distance $s_n$, the lateral differential $\eta_n$, and the azimuth $\theta(s_n)$ and the azimuth deviation $d\theta_n$ at the travel path distance $s_n$, of the other vehicle n.

The ECU 21 calculates the threshold value $\eta_{th}(s_n)$ of the lateral differential at the travel path distance $s_n$ of the other vehicle n, by Expression (1), and uses the lateral differential $\eta_n$ and the lateral differential threshold value $\eta_{th}(s_n)$ of the other vehicle n to determine whether or not the determination condition in Expression (3) is satisfied. The ECU 21 judges that the course on which the other vehicle n is the same as the course on which the host vehicle is travelling if this determination condition is satisfied, and judges that the course on which the other vehicle n is travelling is not the same as the course on which the host vehicle is travelling if the determination condition is not satisfied. If it is judged that the course on which the other vehicle n is travelling is the same as the course on which the host vehicle is travelling, then the ECU 21 calculates the azimuth $\xi(s_n)$ at $\eta_{th}(s_n)$ at the travel path distance $s_n$ of the other vehicle n, from Expression (2), and uses the azimuth deviation $d\theta_n$ and the azimuth deviation threshold value $\xi(s_n)+\Delta\xi$ of the other vehicle n to determine whether or not the determination condition in Expression (4) is satisfied. The ECU 21 judges that the other vehicle n has the same direction of travel as the host vehicle if this determination condition is satisfied, and judges that the other vehicle n does not have the same direction of travel as the host vehicle if the determination condition is not satisfied. The ECU 21 determines that the course on which the other vehicle n is traveling is the same as the course on which the host vehicle is travelling if the determination condition in Expression (3) is satisfied and the determination condition in Expression (4) is also satisfied.

Upon completing the determination described above in respect of all of the other vehicles n conducting vehicle-to-vehicle communications, the ECU 21 generates an image in which other vehicles which have been determined to be on the same course as the course on which the host vehicle are respectively positioned with respect to the host vehicle. The ECU 21 outputs this image information to the display apparatus 30. The display apparatus 30 displays this image upon acquiring image information from the ECU 21.

According to this vehicle location estimation apparatus 1, by converting to a coordinate system, an origin of which is a position of the host vehicle, and an axis of which is the estimated road radius in the direction of travel of the host vehicle, and judging analytically whether the course on which other vehicle is travelling is the same as the course on which the host vehicle is traveling by taking account of the width of the course, sensor error (GPS relative location error, azimuth error, error in the estimated road radius), driving error (error in the azimuth and error in the estimated road curvature due to deviation of the vehicle), and change in the curvature of the course, it is possible to accurately determine whether or not the course on which other vehicles is travelling are the same as the course on which the host vehicle is travelling, by means of simple equipment. In this same-course determination, there is no need for a map or a high-precision location (a location detection device, such as a GPS receiver apparatus, which is conventionally installed in a vehicle is sufficient), and there is no need for the travel trajectories of the other vehicles either. Moreover, empirical mapping, such as own lane probability, which is used in adaptive cruise control (ACC), pre-crash safety system (PCS), or the like, adapted to the travel scenario and installed sensors, etc., is not necessary either, and the method can be applied and adapted easily even if there are changes in the course (the object road) or the sensors (sensing error), and the like. Furthermore, it is also possible to set a course range of the necessary level in accordance with the previously assumed road design parameters, in response to change in the curvature of the road. This easily enables application to various vehicle models. Furthermore, the method can also be adapted to circumstances where vehicle-to-vehicle communications are not widely disseminated.

According to this vehicle location estimation apparatus 1, since absolute information is acquired from the other vehicles by vehicle-to-vehicle communications, then it is possible to determine whether or not other vehicles conducting vehicle-to-vehicle communications are on the same course as the course on which the host vehicle is travelling, by converting to a relative coordinate system, an origin of which is a position of the host vehicle, and an axis of which is an estimated road radius in the direction of travel of the host vehicle, using the absolute locations and absolute azimuths of the other vehicles, and various information about the host vehicle.

Figure 4:
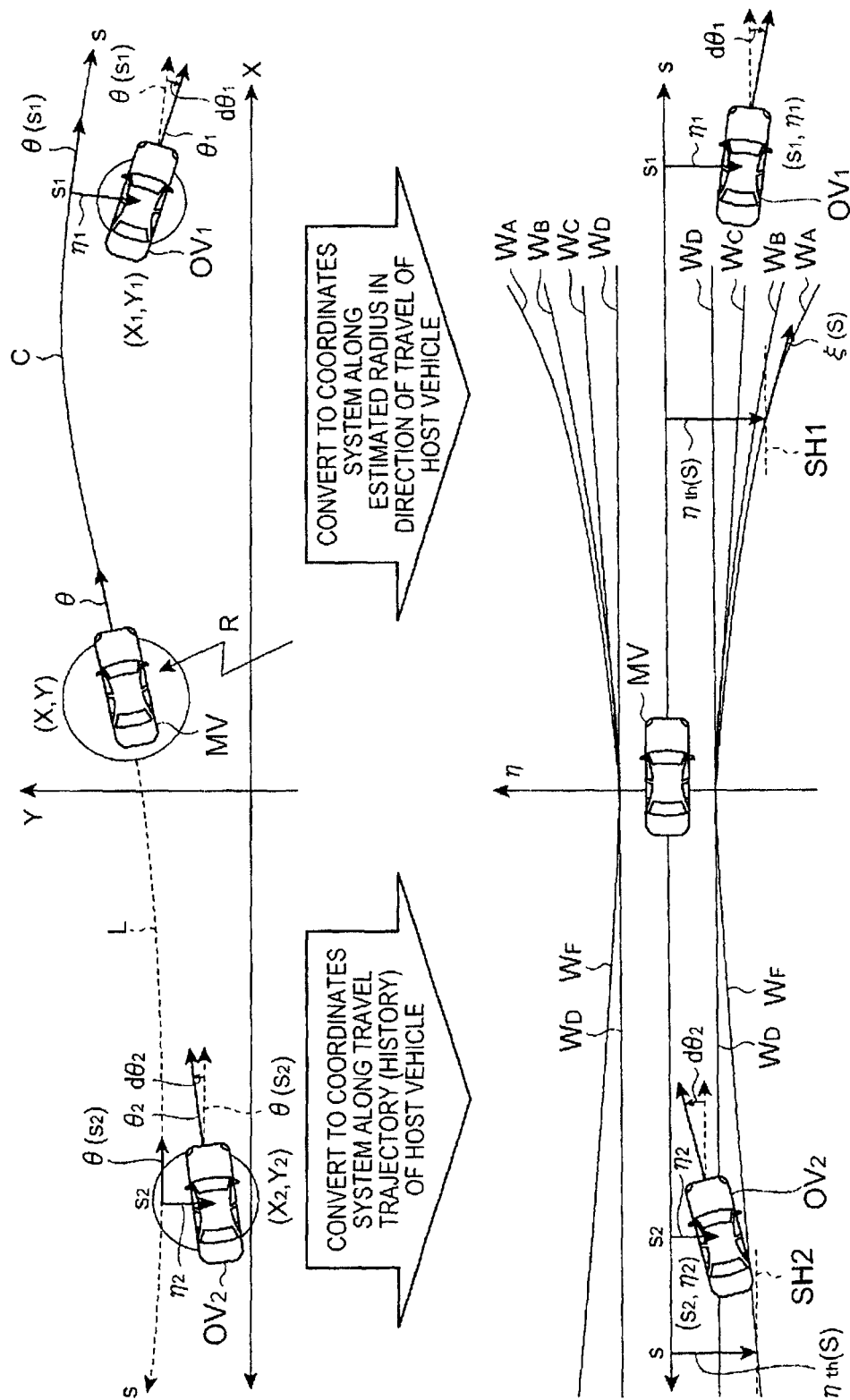
FIG. 4 is an illustrative drawing of a same-course determination method (in particular to the rear of the host vehicle) relating to the second embodiment.

The vehicle location estimation apparatus 2 relating to the second embodiment is now described with reference to FIGS. 1 and 4. FIG. 1 is a schematic drawing of the vehicle location estimation apparatus. FIG. 4 is a schematic drawing of a same-course determination method (showing, in particular, the rear side of the host vehicle).

Compared to the vehicle location estimation apparatus 1 relating to the first embodiment, in the vehicle location estimation apparatus 2, the determination method relating to other vehicles in the rear of the host vehicle (and in particular, the threshold value setting method) is altered in order to improve the determination accuracy with respect to other vehicles in the rear of the host vehicle. More specifically, the vehicle location estimation apparatus 2 converts the coordinate system of the other vehicles to a coordinate system (relative coordinate system), an origin of which is a position of the host vehicle, and an axis of which is the travel trajectory of the host vehicle, sets a threshold value taking account of the width of the course, the GPS relative location error, and the drift error per travel distance of the travel trajectory, and performs a same-course determination by comparison with this threshold value.

In the case of the first embodiment, calculation is made using Expression (1) which has zero-order to third-order terms and takes the travel path distance s as the variable, when setting the same-course range, and therefore the same-course determination range (lateral differential threshold value) becomes broader, the longer the travel path distance s. In respect of the area in the rear of the host vehicle, there is a record (history of the travel trajectory) of the travel already performed by the host vehicle, and therefore by using this travel trajectory, the same-course determination range is prevented from becoming broader, and the determination accuracy is improved.

The vehicle location estimation apparatus 2 is provided with a vehicle-to-vehicle communications apparatus 10, a GPS receiver apparatus 11, an azimuth sensor 12, a yaw rate sensor 13, a vehicle speed sensor 14, an ECU 22, and a display apparatus 30. The yaw rate sensor 13, the vehicle speed sensor 14 and the ECU 22 of the second embodiment may be regarded as the road radius estimation device of the present invention, and the ECU 22 of the second embodiment may be regarded as the travel trajectory acquisition device, the travel distance acquisition device, the coordinate conversion device and the determination device of the present invention.

The ECU 22 is an ECU constituted by a CPU, a ROM, a RAM, and the like, and the ECU 21 implements overall control of the vehicle location estimation apparatus 2. Similarly to the ECU 21 relating to the first embodiment, at predetermined time intervals, the ECU 22 acquires information about the respective other vehicles n from the vehicle-to-vehicle communications apparatus 10, and also acquires various detection information from the GPS receiver apparatus 11, the azimuth sensor 12, the yaw rate sensor 13 and the vehicle speed sensor 14. Moreover, similarly to the ECU 21 relating to the first embodiment, at predetermined intervals, the ECU 22 sends information to the vehicle-to-vehicle communications apparatus 10, in order to transmit information about the host vehicle to the other vehicles by vehicle-to-vehicle communications. Furthermore, for each other vehicle n conducting vehicle-to-vehicle communications, the ECU 22 determines whether or not the other vehicle n is on the same course, by using the acquired information about the other vehicle and the information about the host vehicle, and outputs image information indicating another vehicle which is determined to be on the same course on the basis of this determination result, to the display apparatus 30. The same-course determination process is similar to the determination process performed by the ECU 21 relating to the first embodiment in respect of other vehicles in front of the host vehicle, and therefore description thereof is omitted here, and only the determination process relating to other vehicles in the rear of the host vehicle is described below in detail.

Before describing the same-course determination process, the coordinate system used by the ECU 22 will be described with reference to FIG. 4. In FIG. 4, since the front side of the host vehicle MV is similar to FIG. 3, a detailed description of the rear side in host vehicle MV is given here. The coordinate system on the upper side in FIG. 4 is an absolute coordinate system similar to FIG. 3, and the rear side of the host vehicle MV is also shown. In this absolute coordinate system, the host vehicle MV is positioned at the absolute location (X,Y), the direction of travel of the absolute azimuth θ is indicated, the other vehicle, $OV_2$, is positioned at the absolute location $(X_2,Y_2)$ in the rear of the host vehicle MV, and the direction of travel of the absolute azimuth $θ_2$ thereof is indicated. The circles at the host vehicle MV and the other vehicle $OV_2$ respectively indicate the GPS relative location error centered on (X,Y) and $(X_2,Y_2)$. The curve L indicated by the dotted line extending in the rear of the host vehicle MV indicates the travel trajectory of the host vehicle MV. The value s on the curve L of the dotted line indicates the travel distance (travel path distance) along the travel trajectory. $η_2$ is the lateral differential (deviation in the lateral position) from the travel trajectory of the host vehicle MV (dotted curve L) to the absolute location $(X_2, Y_2)$ of the other vehicle $OV_2$. $s_2$ is the travel path distance corresponding to the absolute location $(X_2,Y_2)$ of the other vehicle $OV_2$. $θ(s_2)$ is the absolute azimuth of the travel path direction (the tangential direction to the dotted curve L) at the travel path distance $s_2$. $dθ_2$ is the azimuth deviation of the absolute azimuth $θ_2$ of the other vehicle from the absolute azimuth $θ(s_2)$.

Furthermore, the coordinate system in the rear side of the host vehicle MV in the lower side of FIG. 4 is a relative coordinate system, an origin of which is the host vehicle MV, and an axis of which is the travel trajectory of the host vehicle MV (the dotted curve L), in which the s axis represents the travel path distance (travel distance) and the η axis represents the lateral differential. In this relative coordinate system, the host vehicle MV is positioned at the point of origin, the other vehicle $OV_2$ is positioned at $(s_1,η_2)$ and the direction of travel of the azimuth deviation $dθ_2$ is indicated.

Furthermore, the threshold value of the lateral differential and the threshold value of the azimuth used by the ECU 22 when determining other vehicles in the rear of the host vehicle will be described with reference to FIG. 4. In the second embodiment, in respect of the rear side of the host vehicle, the same-course range $η_{th}(s)$ with respect to the semiconductor MV is represented geometrically by Expression (5) taking the travel path distance (travel distance) s as a variable in the s-η coordinate system and using the coefficients D and F described below. This $η_{th}(s)$ is the threshold value of the lateral differential at the travel path distance s, and if the lateral differential of the other vehicle comes inside the dotted line SH2 ($η_{th}(s)$) (on both the left and right sides when making a determination) as shown in FIG. 4, then the other vehicle is on the same course as the course on which the host vehicle MV is travelling.

[Expression 5]

$$η_{th}(s)=Fs+D \qquad (5)$$

which s<0

The value D in Expression (5) is the value D described in the first embodiment. F[m/m] in Expression (5) is a first-order coefficient, which takes account of the drift error per travel distance on the travel trajectory. This drift error is set in advance by real vehicle experimentation, or the like, using the yaw rate sensor 13, the vehicle speed sensor 14 or the GPS receiver apparatus 11. The travel trajectory is found either by dead reckoning based on the yaw rate and the vehicle speed, or on the basis of the absolute location given by GPS. Since integration is used for dead reckoning based on the yaw rate and the vehicle speed, the drift component increases with the travel distance, and therefore the drift error becomes larger. On the other hand, in the case of an absolute location based on GPS, the drift component is very small indeed, and therefore the drift error is minimal. However, in the case of an absolute location based on GPS, the absolute location cannot be obtained when, for instance, the vehicle enters a tunnel and the GPS signal cannot be received, and therefore the travel trajectory is found by dead reckoning on the basis of the yaw rate and the vehicle speed. Fs is a first-order term (which increases in direct proportion to the travel distance (travel path distance) s), and therefore a same-course range which also factors in this Fs value is a range $W_F$ which further increases in proportion to the value s from the range $W_D$, as indicated by the s-η coordinate system in FIG. 4. Since the course range $W_F$ only increases due to the drift error per travel distance on the travel trajectory (only by a first-order term with respect to variable s; there is no second-order term or third-order term), then the amount of increase is small, even if the travel path distance s is large.

Furthermore, the slant (azimuth) ξ(s) at the travel path distance (travel distance) s is found on the basis of the travel trajectory of the host vehicle. The angle obtained by adding the angle deviation margin Δξ of the vehicle to this azimuth value ξ(s) is the threshold value for the azimuth at the travel path distance "s". If the azimuth deviation of the other vehicle comes within this azimuth threshold value, then it is considered that the other vehicle is traveling in the same direction as the host vehicle MV.

Next, the same-course determination process will be described. For each of the other vehicles n (n=1, 2, ... ), the ECU 22 determines whether the other vehicle n is in front of or in the rear of the host vehicle. The determination method may be a method which makes a determination by comparing the absolute location (X,Y) of the host vehicle with the absolute location $(X_n, Y_n)$ of the other vehicle n, taking account of the direction of travel (azimuth θ) of the host vehicle, or a method which makes a determination by arranging the other vehicles n on the s-η coordinate system, an origin of which is the host vehicle MV, and an axis of which is the estimated road radius R in the direction of travel of the host vehicle MV, as described in the first embodiment. In the case of another vehicle in front of the host vehicle, the ECU 22 carries out same-course determination by a similar process to the ECU 21 relating to the first embodiment.

In the case of another vehicle in the rear of the host vehicle, the ECU 22 converts the absolute location $(X_n, Y_n)$ and the absolute azimuth θn of the other vehicle n of the absolute coordinate system to the s-η coordinate system, an origin of which is the host vehicle MV, and an axis of which is the travel trajectory of the host vehicle MV, by using the information held by the ECU 22 about the travel trajectory of the host vehicle, the travel distance along the travel trajectory, and the absolute location $(X_n, Y_n)$ and absolute azimuth $θ_n$ of the other vehicle n. The ECU 22 then calculates the travel path distance (travel distance) $s_n$, the lateral differential $η_n$, the absolute azimuth $θ(s_n)$ of the travel path direction at the travel path distance $s_n$, and the azimuth deviation $dθ_n$, for the other vehicle n in this s-η coordinate system.

The ECU 22 calculates the threshold value $η_{th}(s_n)$ of the lateral differential at the travel path distance (travel distance) $s_n$ of the other vehicle n, by Expression (5). The ECU 22 then uses the lateral differential $η_n$ and the lateral differential threshold value $η_{th}(s_n)$ of the other vehicle n to determine whether or not the determination condition in Expression (3) is satisfied. If the determination condition in Expression (3) is satisfied, then the ECU 22 determines that the course on which the other vehicle n is travelling is the same as the course on which the host vehicle is travelling. Furthermore, if the determination condition in Expression (3) is not satisfied, then the ECU 22 determines that the course on which the other vehicle n is travelling is not the same as the course on which the host vehicle is travelling.

The ECU 22 calculates the slant (azimuth) $ξ(s_n)$ of the travel trajectory of the host vehicle at the travel path distance $s_n$ of the other vehicle n. Thereupon, the ECU 22 uses the azimuth deviation $dθ_n$ and the azimuth deviation threshold value $ξ(s_n)+Δξ$ of the other vehicle n to determine whether or not the determination condition in Expression (4) is satisfied. If the determination condition in Expression (4) is satisfied, then the ECU 22 judges that the other vehicle n has the same direction of travel as the host vehicle. If the determination condition in Expression (4) is not satisfied, then the ECU 22 judges that the other vehicle n does not have the same direction of travel as the host vehicle.

The ECU 22 determines that the course on which the other vehicle n is travelling in the rear of the host vehicle is the same as the course on which the host vehicle is travelling if the determination condition in Expression (3) is satisfied and the determination condition in Expression (4) is also satisfied.

The ECU 22 finds the travel trajectory using dead reckoning based on the yaw rate γ and the vehicle speed V or the absolute location (X,Y) based on GPS, and finds the travel distance along the travel trajectory. The ECU 22 holds this data about the travel trajectory and the travel distance for a prescribed amount of time or for a prescribed distance.

The operation of the vehicle location estimation apparatus 2 having the composition described above will now be explained. In the vehicle location estimation apparatus 2, the operations indicated below are carried out repeatedly. The operation of the other vehicle n is similar to the operation described in the first embodiment, and is therefore not described here. Furthermore, the various operations of the vehicle-to-vehicle communications apparatus 10, the GPS receiver apparatus 11, the azimuth sensor 12, the yaw rate sensor 13 and the vehicle speed sensor 14 are similar to the operations described in the first embodiment, and are therefore not described here. The ECU 22 finds and saves the travel trajectory, and the travel distance along the travel trajectory, each time the yaw rate and the vehicle speed (or the absolute location) are acquired.

For each of the other vehicles n, the ECU 22 determines whether the other vehicle n is in front of or in the rear of the host vehicle. When the other vehicle n is in front of the host vehicle, then the ECU 22 determines whether or not the course on which other vehicle n is travelling is the same as the course on which the host vehicle is travelling by an operation similar to that described in the first embodiment.

If the other vehicle n is in the rear of the host vehicle, the ECU 22 uses the travel trajectory of the host vehicle, the travel distance along this travel trajectory, and the absolute location $(X_n, Y_n)$ and the absolute azimuth $θ_n$ of the other vehicle n to convert the absolute location $(X_n, Y_n)$ and the absolute azimuth $θ_n$ of the other vehicle n in the absolute coordinate system, to an s-η coordinate system, an origin of which is the host vehicle MV, and an axis of which is the travel trajectory of the host vehicle MV, and respectively calculates the travel path distance $s_n$, the lateral differential $η_n$, the azimuth $θ(s_n)$ of the travel path direction at the travel path distance $s_n$, and the azimuth deviation $dθ_n$ of the other vehicle n.

The ECU 22 calculates the threshold value $η_{th}(s_n)$ of the lateral differential at the travel path distance (travel distance) $s_n$ of the other vehicle n, by Expression (5), and uses the lateral differential $η_n$ and the lateral differential threshold value $η_{th}(s_n)$ of the other vehicle n to determine whether or not the determining condition in Expression (3) is satisfied. The ECU 22 judges that the course on which the other vehicle n is travelling is the same as the course on which the host vehicle is travelling if this determination condition is satisfied, and judges that the course on which the other vehicle n is travelling is not the same as the course on which the host vehicle is travelling if the determination condition is not satisfied. If it is judged that the course on which the other vehicle n is travelling is the same as the course on which the host vehicle is travelling, then the ECU 22 calculates the azimuth $ξ(s_n)$ at the travel path distance $s_n$ of the other vehicle n, from the travel trajectory of the host vehicle, and uses the azimuth deviation $dθ_n$ and the azimuth deviation threshold value $ξ(s_n)+Δξ$ of the other vehicle n to determine whether or not the determination condition in Expression (4) is satisfied. The ECU 22 judges that the other vehicle n has the same direction of travel as the host vehicle if this determination condition is satisfied, and judges that the course on which the other vehicle n is travelling is not the same as the course on which the host vehicle is travelling if the determination condition is not satisfied. The ECU 22 determines that the course on which the other vehicle n is travelling is the same as the course on which the host vehicle is travelling if the determination condition in Expression (3) is satisfied and the determination condition in Expression (4) is also satisfied.

The respective operations of the ECU 22 and the display apparatus 30 after completing determination in respect of all of the other vehicles n conducting vehicle-to-vehicle communications are similar to the operations described in the first embodiment, and therefore description thereof is omitted here.

The vehicle location estimation apparatus 2 has the following beneficial effects in addition to having similar beneficial effects to the vehicle location estimation apparatus 1 relating to the first embodiment. According to the vehicle location estimation apparatus 2, in the case of another vehicle in the rear of the host vehicle, by converting to a coordinate system, an origin of which is the host vehicle, and an axis of which is the travel trajectory of the host vehicle in the rear of the host vehicle, and determining analytically whether or not the course on which the other vehicle is travelling is the same as the course on which the host vehicle is travelling, by taking account of the course width, the GPS relative location error, and the drift error per travel distance on the travel trajectory, it is possible to suppress broadening of the same-course determination range the greater the travel path distance (the further the distance to the other vehicle), and as the results, the same-course determination accuracy on the rear side of the host vehicle can be improved.

Figure 5:
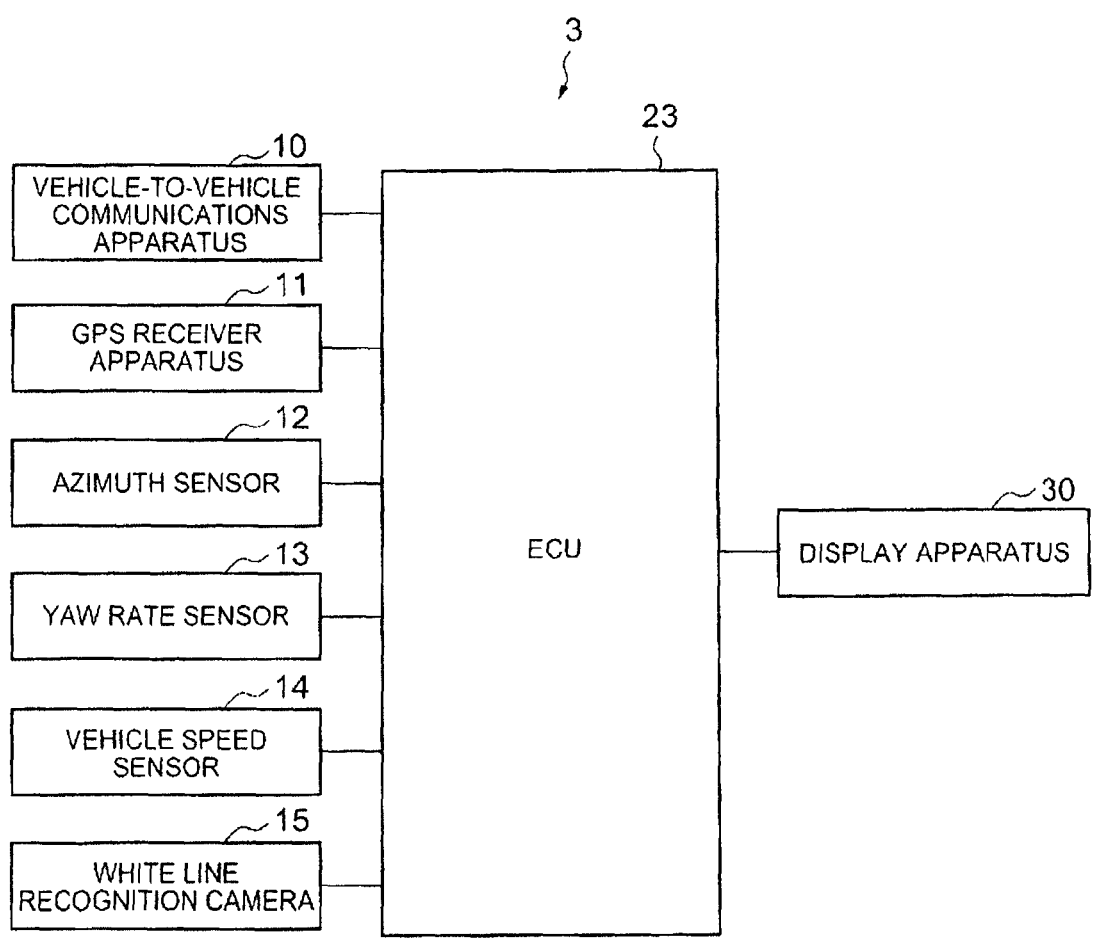
FIG. 5 is a schematic drawing of a vehicle location estimation apparatus relating to a third embodiment.
Figure 6:
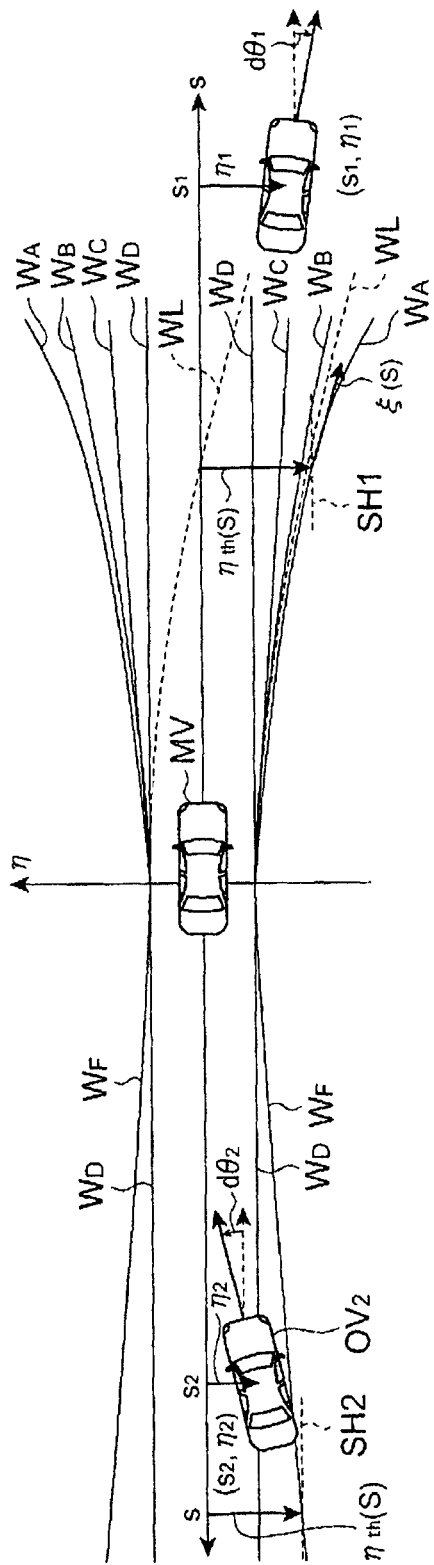
FIG. 6 is an illustrative drawing of a same-course determination method (in particular in front of the host vehicle) relating to the third embodiment.

The vehicle location estimation apparatus 3 relating to the third embodiment is now described with reference to FIGS. 5 and 6. FIG. 5 is a schematic drawing of the vehicle location estimation apparatus. FIG. 6 is a schematic drawing of a same-course determination method (showing, in particular, the front side of the host vehicle).

Compared to the vehicle location estimation apparatus 2 relating to the second embodiment, the vehicle location estimation apparatus 3 has a different threshold value setting method (and in particular, the method of setting the coefficient A in the mathematical formula model used for calculation of the threshold value), in order to improve the determination accuracy with respect to other vehicles in front of the host vehicle. More specifically, the vehicle location estimation apparatus 3 is fitted with a white line recognition camera, and the clothoid curve parameter of the course in front of the host vehicle is set accurately by using estimated course parameters (curvature, rate of change in curvature, etc.) based on the white line recognition camera.

In the case of the first embodiment, calculation is made using Expression (1) which has zero-order to third-order terms and takes the travel path distance s as the variable, when setting the same-course range, and therefore the same-course determination range becomes broader, the longer the travel path distance s. In particular, the third-order term becomes greater with the third power of the travel path distance s, and therefore the third-order term affects the broadening of the same-course determination range. Therefore, in respect of the third-order coefficient (the clothoid curve parameter) A, since the curvature and the rate of change in the curvature of the lane in front of the host vehicle are obtained with high accuracy by the white line recognition camera, then by using this information, the coefficient A is restricted (made smaller), and the determination accuracy is improved (broadening of the same-course determination range is suppressed).

The vehicle location estimation apparatus 3 is provided with a vehicle-to-vehicle communications apparatus 10, a GPS receiver apparatus 11, an azimuth sensor 12, a yaw rate sensor 13, a vehicle speed sensor 14, a white line recognition camera 15, an ECU 23 and a display apparatus 30. In the third embodiment, the yaw rate sensor 13, the vehicle speed sensor 14 and the ECU 23 of the third embodiment may be regarded as the road radius estimation device of the present invention, the white line recognition camera 15 of the third embodiment may be regarded as the camera, the lane detection device, the curvature calculation device and the curvature change calculation device of the present invention, and the ECU 23 of the third embodiment may be regarded as the travel trajectory acquisition device, the travel distance acquisition device, the coordinate conversion device and the determination device of the present invention.

The white line recognition camera 15 is a camera sensor for recognizing a left and right pair of white lines which constitute a traffic lane, and is composed by a camera and a processing apparatus. The white line recognition camera 15 captures an image of a region including the road in front of the host vehicle, by the camera, and acquires the captured image. The white line recognition camera 15 recognizes the left and right pair of white lines constituting a lane, from the captured image, at predetermined time intervals. The recognition method is, for example, a method based on edge processing, since there is a large brightness differential between the road surface and the white lines painted thereon. The white line recognition camera 15 calculates the lane width from the left and right pair of white lines thus recognized, and also calculates a line passing through the center of the left and right pair of white lines (the center line of the lane), at predetermined time intervals. Moreover, the white line recognition camera 15 calculates the radius and curvature, and the like, at each position on the center line of the lane, and thereby calculates the rate of change of the curve from the curvature data at each position. The white line recognition camera 15 sends various information, such as the white line recognition results and the calculated curvature and rate of change of the curvature to the ECU 23 at predetermined time intervals. The curvature and rate of change of the curvature may be calculated by the ECU 23.

The ECU 23 is an ECU constituted by a CPU, a ROM, a RAM, and the like, and the ECU 23 implements overall control of the vehicle location estimation apparatus 3. Similarly to the ECU 21 relating to the first embodiment, at predetermined time intervals, the ECU 23 acquires information about the respective other vehicles n from the vehicle-to-vehicle communications apparatus 10, and also acquires various detection information from the GPS receiver apparatus 11, the azimuth sensor 12, the yaw rate sensor 13 and the vehicle speed sensor 14. The ECU 23 also acquires recognition information from the white line recognition camera 15, at predetermined intervals. Moreover, similarly to the ECU 21 relating to the first embodiment, at predetermined intervals, the ECU 23 sends information to the vehicle-to-vehicle communications apparatus 10, in order to transmit information about the host vehicle to the other vehicles by vehicle-to-vehicle communications. Furthermore, for each other vehicle n conducting vehicle-to-vehicle communications, the ECU 23 determines whether or not the other vehicle n is on the same course, by using the acquired information about the other vehicle and the information about the host vehicle, and outputs image information indicating another vehicle which is determined to be on the same course on the basis of this determination result, to the display apparatus 30. The same-course determination process is similar to the determination process performed by the ECU 22 relating to the second embodiment in respect of other vehicles in the rear of the host vehicle, and therefore description thereof is omitted here, and only the determination process relating to other vehicles in front of the host vehicle is described below in detail.

Before describing the same course determination process, the coordinate system used by the ECU 23 will be described with reference to FIG. 6. The coordinate system used by the ECU 23 is similar to the coordinate system described in the first embodiment in respect of the front side of the host vehicle, and is similar to the coordinate system described in the second embodiment in respect of the rear side of the host vehicle. As indicated by the s-η coordinate system in FIG. 6, the left and right pair of white lines WL in front of the host vehicle MV are recognized by the white line recognition camera 15. Moreover, the forward course parameters (curvature, rate of change of curvature) are obtained on the basis of the left and right pair of white lines WL, and the direction in which the course is changing (rightwards, leftwards, straight-ahead) is also obtained. Thereupon, a value obtained by adding an assumed error to the forward course parameters obtained by the white line recognition camera 15 is set for the third-order coefficient A in Expression (1). This assumed error is set in advance by real vehicle experimentation, or the like. Apart from the coefficient A, it is also possible to set a coefficient B relating to the road curvature, or the like, by using the forward course parameters obtained by the white line recognition camera 15.

Next, the same-course determination process will be described. For each of the other vehicles n (n=1, 2, ... ), the ECU 23 determines whether the other vehicle n is in front of or in the rear of the host vehicle. In the case of another vehicle in the rear of the host vehicle, the ECU 23 carries out same-course determination by a similar process to the ECU 22 relating to the second embodiment.

If the other vehicle is in front of the host vehicle, then the ECU 23 sets the coefficient A in Expression (1) by using the estimated course parameters (curvature, rate of change of curvature) acquired from the white line recognition camera 15. The ECU 23 then converts to an s-η coordinate system, an origin of which is the host vehicle MV, and an axis of which is the estimated road radius R in the direction of travel of the host vehicle MV, by similar processing to that of the ECU 21 relating to the first embodiment, and respectively calculates the travel path distance $s_n$, the lateral differential $\eta_n$, the azimuth $\theta(s_n)$ in the travel path direction at the travel path distance $s_n$, and the azimuth deviation $d\theta_n$, of the other vehicle n. The ECU 23 also calculates the threshold value $\eta_{th}(s_n)$ of the lateral differential at the travel path distance $s_n$ of the other vehicle n, by Expression (1) using an optimized coefficient A. The ECU 23 then uses the lateral differential $\eta_n$ and the lateral differential threshold value $\eta_{th}(s_n)$ of the other vehicle n to determine whether or not the determination condition in Expression (3) is satisfied. In this determination, rather than making a determination with regard to both the left and right-hand sides of the host vehicle, it is also possible to make a determination only in the direction of progressive change in the course, as acquired from the white line recognition camera 15. The processing thereafter is similar to that performed by the ECU 21 relating to the first embodiment, and therefore description thereof is omitted here.

The operation of the vehicle location estimation apparatus 3 having the composition described above will now be explained. In the vehicle location estimation apparatus 3, the operations indicated below are carried out repeatedly. The operation of the other vehicle n is similar to the operation described in the first embodiment, and description thereof is omitted here. Furthermore, the various operations of the vehicle-to-vehicle communications apparatus 10, the GPS receiver apparatus 11, the azimuth sensor 12, the yaw rate sensor 13 and the vehicle speed sensor 14 are similar to the operations described in the first embodiment, and are therefore not described here. In the white line recognition camera 15, a pair of left and right white lines in front of the host vehicle are recognized, the curve and rate of change in the curve of the lane constituted by the left and right pair of white lines are calculated, and these recognition results are sent to the ECU 23. The ECU 23 acquires the recognition results from the white line recognition camera 15 (estimated travel parameters, (curve, rate of change of curve), etc.).

For each of the other vehicles n, the ECU 23 determines whether the other vehicle n is in front of or in the rear of the host vehicle. When the other vehicle n is in the rear of the host vehicle, then the ECU 23 determines whether or not the course on which the other vehicle n is travelling is the same as the course on which the host vehicle is travelling by a process similar to that described in the second embodiment. If the other vehicle n is in front of the host vehicle, then the ECU 23 sets the coefficient A in Expression (1) by using the estimated course parameters (curvature, rate of change of curvature). The ECU 23 determines whether or not the course on which the other vehicle n is travelling is the same as the course on which the host vehicle is travelling, by a similar process to that described in the first embodiment, by using Expression (1) in which this value of the coefficient A has been set.

The respective operations of the ECU 23 and the display apparatus 30 after completing determination in respect of all of the other vehicles n conducting vehicle-to-vehicle communications are similar to the operations described in the first embodiment, and therefore description thereof is omitted here.

The vehicle location estimation apparatus 3 has the following beneficial effects in addition to having similar beneficial effects to the vehicle location estimation apparatus 2 relating to the second embodiment. According to the vehicle location estimation apparatus 3, by using course parameters (curvature, rate of change of curvature) estimated by the white line recognition camera 15, it is possible to set at least the coefficient A in Expression (1) to a suitable value in accordance with the actual course, and therefore a highly accurate same-course determination range can be set and the accuracy of same-course determination can be improved. In particular, it is possible to prevent the same-course determination range from broadening, the longer the travel path distance.

Figure 7:
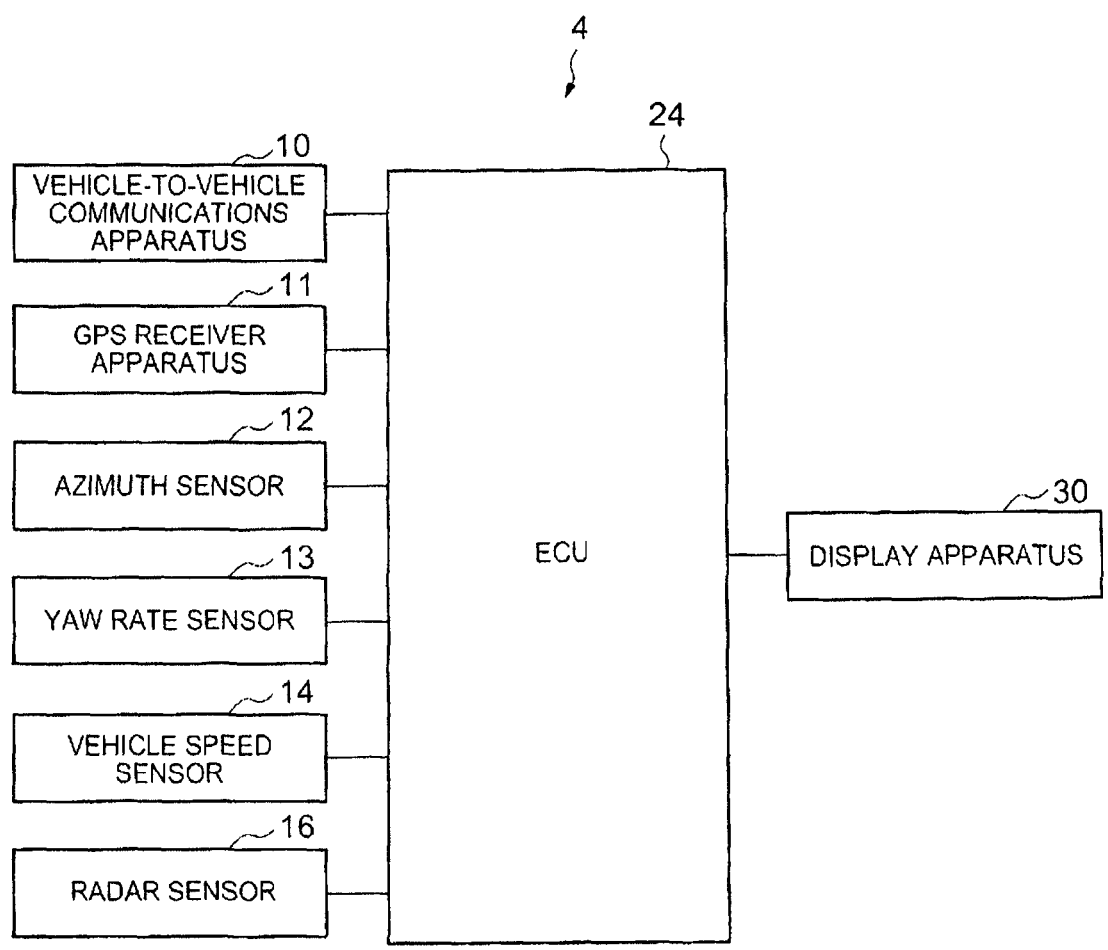
FIG. 7 is a schematic drawing of a vehicle location estimation apparatus relating to a fourth embodiment.
Figure 8:
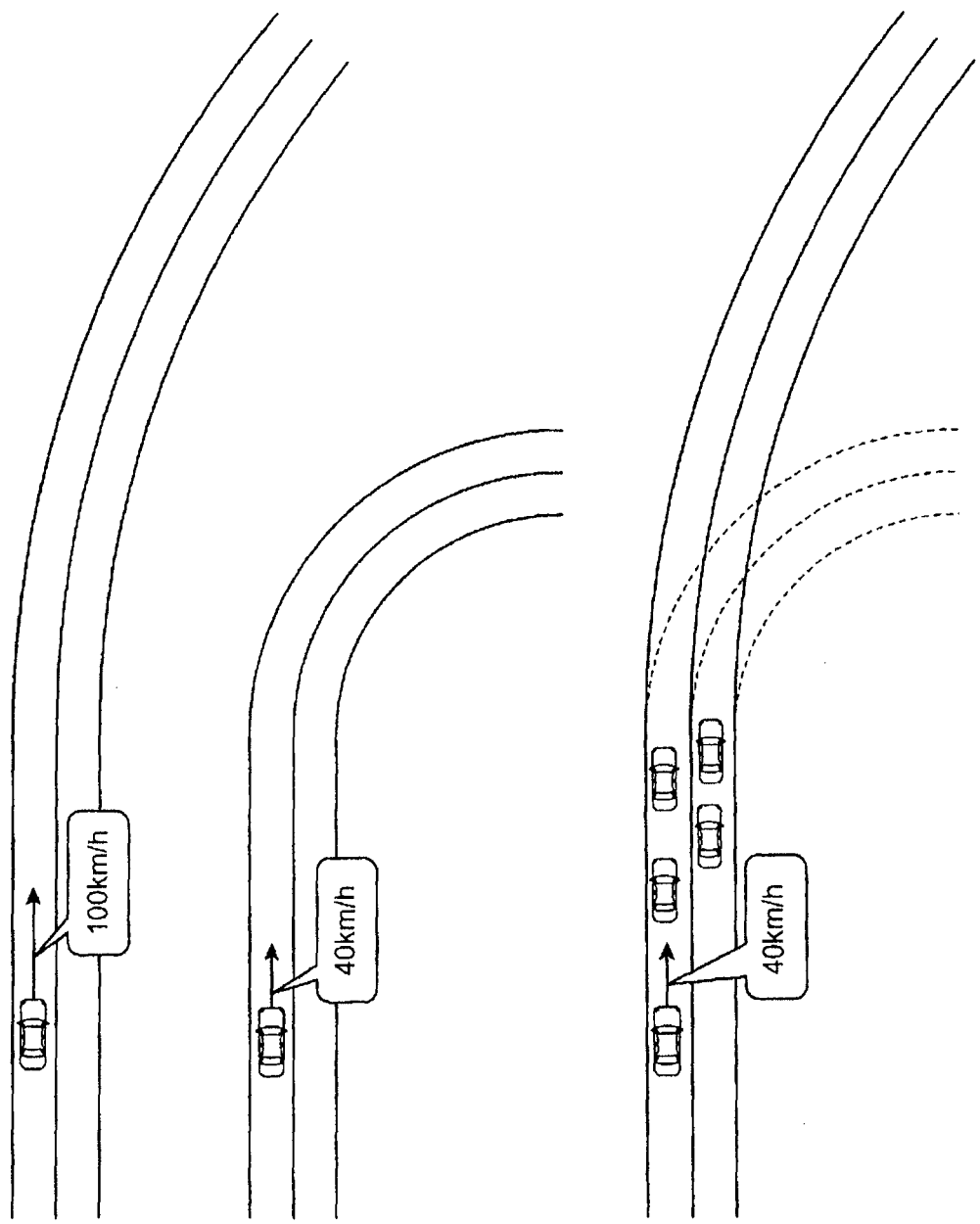
Figure 9:
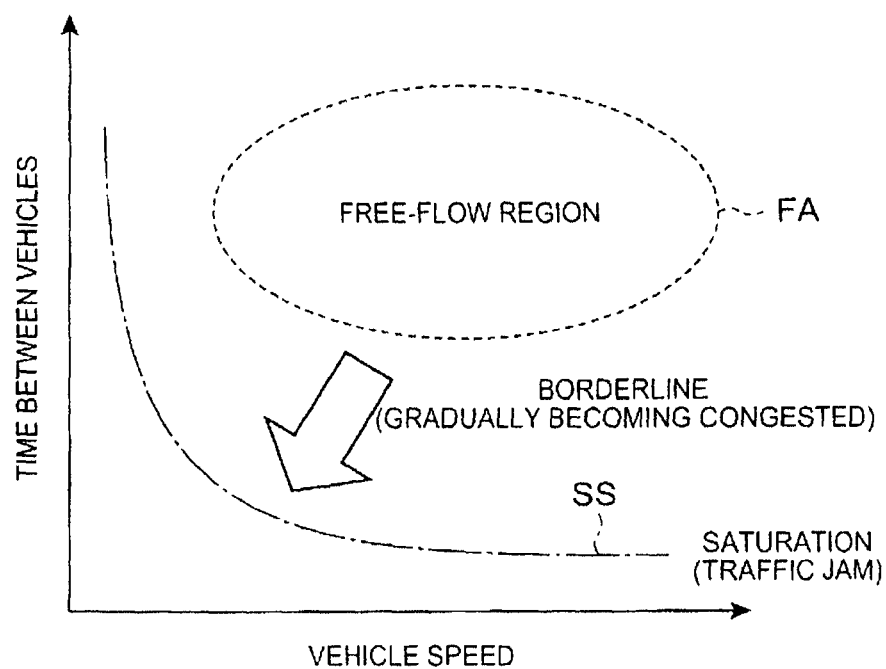
FIG. 9 is a vehicle speed-time between vehicles map relating to the fourth embodiment.

The vehicle location estimation apparatus 4 relating to the fourth embodiment is now described with reference to FIGS. 4 to 9. FIG. 7 is a schematic drawing of the vehicle location estimation apparatus. FIGS. 8A to 8C are examples of the relationship between the vehicle speed and the road alignment, wherein FIG. 8A shows a case where the vehicle is traveling in free flowing traffic, and the vehicle speed is 100 km/h, FIG. 8B shows a case where the vehicle is traveling in free flowing traffic and the vehicle speed is 40 km/h, and FIG. 8C shows a case where the vehicle is not traveling in free flowing traffic and the vehicle speed is 40 km/h. FIG. 9 is a map of vehicle speed against time between vehicles.

Compared to the vehicle location estimation apparatus 2 relating to the second embodiment, the vehicle location estimation apparatus 4 has a different threshold value setting method (and in particular, the method of setting the coefficient A in the mathematical formula model used for calculation of the threshold value), in order to improve the determination accuracy with respect to other vehicles in front of the host vehicle. More specifically, the vehicle location estimation apparatus 4 uses the road alignment corresponding to the vehicle speed when the host vehicle is traveling in free flowing traffic to set a highly accurate clothoid curve parameter for the forward course of the host vehicle.

As described in the third embodiment, the third-order term in Expression (1) (the error due to the road alignment (easement); the assumed clothoid curve parameter) has a great effect on the broadening of the same-course determination range. If the vehicle is traveling in free flowing traffic (a road free from congestion or a traffic jam, where the vehicle travels freely without being affected by vehicles in the periphery of the host vehicle), then the driver of the vehicle can travel by selecting a vehicle speed suited to the road, and in this case there is a high correlation between the vehicle speed and the category of road. Therefore, the road alignment corresponding to the vehicle speed when the vehicle is traveling in free flowing traffic is estimated in relation to the third-order coefficient (clothoid curve parameter) A, and by using this road alignment, the coefficient A is restricted (made smaller), and the determination accuracy is improved (broadening of the same-course determination range is prevented).

It should be noted that, for example, when the central government designs roads, the road alignment (number of lanes, course width, easement parameter, easement curve length, etc.) is decided in accordance with the vehicle speed when the vehicle is traveling in free flowing traffic. For example, when the vehicle speed is 100 km/h in free flowing traffic as shown in FIG. 8A, then a road alignment is adopted in which the minimum radius is 460 m, the minimum easement section length is 85 m, and the general carriageway width is 3.5 m, whereas when the vehicle speed is 40 km/h in free flowing traffic as shown in FIG. 8B, the minimum radius is 60 m, the minimum easement section length is 35 m, and the general carriageway width is 2.75 to 3 m. Consequently, during travel in free flowing traffic, if the vehicle speed is recognized, than the road alignment where the vehicle is traveling can be estimated. The road radius becomes smaller (the curvature becomes greater), the lower the vehicle speed, and therefore the easement section in which the road radius (curvature) changes also becomes shorter. On the other hand, as shown in FIG. 8C, if the vehicle speed is 40 km/h when not traveling in free flowing traffic, the vehicle speed becomes 40 km/h due to the effects of peripheral vehicles (and in particular, vehicles in front), and therefore there is a low correlation (or no correlation) between the vehicle speed and the road alignment. Therefore, even when the vehicle speed is 40 km/h, the road alignment is not one in which the minimum radius is 60 m, the minimum easement section length is 35 m and the general carriageway width is 2.75 to 3 m. Consequently, when the vehicle is not traveling in free flowing traffic, the road alignment where the vehicle is traveling cannot be estimated from the vehicle speed. In this case, it may be possible to estimate the road alignment being travelled by assuming that there is a continuation of the road alignment corresponding to the vehicle speed when the vehicle was last traveling in free flowing traffic.

The vehicle location estimation apparatus 4 is provided with a vehicle-to-vehicle communications apparatus 10, a GPS receiver apparatus 11, an azimuth sensor 12, a yaw rate sensor 13, a vehicle speed sensor 14, a radar sensor 16, an ECU 24, and a display apparatus 30. The vehicle speed sensor 14 of the fourth embodiment may be regarded as the vehicle speed detection device of the present invention, the yaw rate sensor 13, the vehicle speed sensor 14 and the ECU 24 of the fourth embodiment may be regarded as the road radius estimation device of the present invention, the vehicle speed sensor 14, the radar sensor 16 and the ECU 24 of the fourth embodiment may be regarded as the time-between-vehicles acquisition device set forth in the claims, and the ECU 24 may be regarded as the travel trajectory acquisition device, the travel distance acquisition device, the coordinate conversion device, the free flow judgment device, the road alignment estimation device and the determination device of the present invention.

The radar sensor 16 is a radar sensor which detects information about vehicles in front of the host vehicle, and is composed by a radar and a processing apparatus. The radar is, for example, a milliwave radar or a laser radar. With a radar sensor 16, a milliwave or other electromagnetic wave is transmitted in front of the host vehicle while scanning in the left/right direction by radar, the reflected wave is received, and information (left/right direction scanning azimuth, transmission time, reception time, reflection intensity, etc.) is acquired for each of the reflection points (detection points) from which a reflected wave could be received. The radar sensor 16 then determines whether or not a vehicle in front is situated within the radar detection range, on the basis of the presence or absence of reflection point information, at prescribed time intervals. If it is determined that there is a vehicle in front, then the radar sensor 16 calculates the relative distance to the vehicle in front on the basis of the time from transmission until reception of the electromagnetic wave. It should be noted that if there is no vehicle in front, then the relative distance is set to infinity. Furthermore, the radar sensor 16 detects the direction of the electromagnetic wave which is reflected back most strongly, of the reflected electromagnetic waves, and calculates the relative direction, and the like, of the vehicle in front from this direction. The radar sensor 16 sends various information, such as the presence or absence of a vehicle in front, and the relative distance, and the like, if there is a vehicle in front, to the ECU 24, at prescribed intervals. The determination of the presence or absence of a vehicle in front, and the calculation of the various information, may also be carried out by the ECU 24.

The ECU 24 is an ECU constituted by a CPU, a ROM, a RAM, and the like, and the ECU 24 implements overall control of the vehicle location estimation apparatus 4. Similarly to the ECU 21 relating to the first embodiment, at predetermined time intervals, the ECU 24 acquires information about the respective other vehicles n from the vehicle-to-vehicle communications apparatus 10, and also acquires various detection information from the GPS receiver apparatus 11, the azimuth sensor 12, the yaw rate sensor 13 and the vehicle speed sensor 14. Furthermore, at predetermined intervals, the ECU 24 acquires vehicle in front presence/absence determination result, and detection information, from the radar sensor 16. Moreover, similarly to the ECU 21 relating to the first embodiment, at predetermined intervals, the ECU 24 sends information to the vehicle-to-vehicle communications apparatus 10, in order to transmit information about the host vehicle to the other vehicles by vehicle-to-vehicle communications. Furthermore, for each other vehicle n conducting vehicle-to-vehicle communications, the ECU 24 determines whether or not the course on which the other vehicle n is travelling is the same as the course on which the host vehicle is travelling, by using the acquired information about the other vehicle and the information about the host vehicle, and outputs image information indicating another vehicle which is determined to be on the same course on the basis of this determination result, to the display apparatus 30. The same-course determination process is similar to the determination process performed by the ECU 22 relating to the second embodiment in respect of other vehicles in the rear of the host vehicle, and therefore description thereof is omitted here, and only the determination process relating to other vehicles in front of the host vehicle is described below in detail. The coordinate system used by the ECU 24 is the same as the coordinate system used by the ECU 22 relating to the second embodiment.

Next, the same-course determination process will be described. For each of the other vehicles n (n=1, 2, . . . ), the ECU 24 determines whether the other vehicle n is in front of or in the rear of the host vehicle. In the case of another vehicle in the rear of the host vehicle, the ECU 24 carries out same-course determination by a similar process to the ECU 22 relating to the second embodiment.

In the case of another vehicle which is in front of the host vehicle, the ECU 24 uses the vehicle speed acquired from the vehicle speed sensor 14 and the relative distance acquired from the radar sensor 16 to calculate the time between vehicles with respect to the vehicle in front (=relative distance (distance between vehicles)/time). It should be noted that if there is no vehicle in front within the detection range of the radar sensor 16, then the relative distance is set to infinity, and therefore the time between vehicles is infinity. Free flowing traffic is a state where the vehicle speed is high and the time between vehicles is long, but when there is congestion, the vehicle speed becomes lower and the time between vehicles becomes shorter. Therefore, it is judged whether or not the vehicle is traveling in free flowing traffic, on the basis of the vehicle speed and the time between vehicles.

The ECU 24 refers to the vehicle speed-time between vehicles map to determine whether or not the host vehicle is traveling in free flowing traffic (or in borderline or congested traffic), from the vehicle speed acquired by the vehicle speed sensor 14 and the calculated time between vehicles. The vehicle speed-time between vehicles map is a map such as that shown in FIG. 9. The free flow region FA is a region where the vehicle speed is high and the time between vehicles is long. If the vehicle speed becomes slower or the time between vehicles becomes shorter, from the free flow region FA, then the vehicle enters a borderline state (gradually becoming more congested). Moreover, if the vehicle speed becomes slower, the time between vehicles becomes shorter, and the saturation line SS is passed, then the vehicle is in a traffic jam. The vehicle speed-time between vehicles map is created in advance by real vehicle experimentation, and the like. The region of the vehicle speed and time between vehicles corresponding to free flowing traffic is set on the basis of the vehicle speed-time between vehicles map, and it is determined whether or not the actual vehicle speed and time between vehicles is within this region. The determination accuracy can be improved by also taking account of information about the other vehicles acquired by vehicle-to-vehicle communications, when determining whether or not the host vehicle is in free flowing traffic.

The ECU 24 overwrites and records the vehicle speed acquired from the vehicle speed sensor 14, upon determining that the vehicle is traveling in free flowing traffic. Moreover, the ECU 24 judges that the vehicle speed acquired by the vehicle speed sensor 14 is a vehicle speed which has been adapted by the driver to suit the road alignment, estimates the road alignment by taking this speed to be a design speed, and sets the coefficient A in Expression (1) on the basis of this road alignment. Here, the coefficient A is derived in advance on the basis of the road alignment corresponding to the design speed, which is decided on the basis of design criteria for each vehicle speed, and the coefficient A for each speed is held in the ECU 24. Therefore, the ECU 24 sets the coefficient A directly on the basis of the vehicle speed acquired from the vehicle speed sensor 14. It should be noted that since the curvature becomes smaller and the easement parameter by which the curvature changes becomes larger, the higher the vehicle speed, then the coefficient A assumes a small value (and conversely, since the curvature becomes larger and the easement parameter becomes smaller, the lower the vehicle speed, then the coefficient A assumes a large value).

In the case of the processing described above, the coefficient A is set in accordance with the actual vehicle speed on the basis of a coefficient A established for each vehicle speed, which is held by the ECU 24, and this corresponds to estimating the road alignment in accordance with the vehicle speed. Rather than holding a coefficient A for each vehicle speed, it is also possible to save a road radius (curvature), easement parameter, course width, and the like, for each vehicle speed, in the ECU 24, to estimate the road alignment, such as the road radius (curvature), and the like, in accordance with the actual vehicle speed, and to calculate the coefficient A from the road radius (curvature), and the like.

If it is determined that the vehicle is not traveling in free flowing traffic, then the ECU 24 estimates the road alignment by taking the overwritten vehicle speed (the vehicle speed when the vehicle was last determined to be traveling in free flowing traffic), as the design speed, and sets the coefficient A in Expression (1) on the basis of this road alignment. In other words, the ECU 24 directly sets the coefficient A on the basis of the recorded vehicle speed. If it is determined that the vehicle is not traveling in free flowing traffic, then it is also possible to set a default value for the coefficient A, rather than setting the coefficient A on the basis of the vehicle speed from the last time that the vehicle was in free flowing traffic. Alternatively, a default value may be set for the coefficient A if the vehicle has travelled a prescribed distance or more after having been determined to be traveling in free flowing traffic, and the coefficient A may be set on the basis of the recorded vehicle speed if the vehicle has travelled less than the prescribed distance after having been determined to be traveling in free flowing traffic.

The ECU 24 then converts to an s-η coordinate system, an origin of which is the host vehicle MV, and an axis of which is the estimated road radius R in the direction of travel of the host vehicle MV, by similar processing to that of the ECU 21 relating to the first embodiment, and respectively calculates the travel path distance $s_n$, the lateral differential $\eta_n$, the azimuth $\theta(s_n)$ in the travel path direction at the travel path distance $s_n$, and the azimuth deviation $d\theta_n$, of the other vehicle n. The ECU 24 also calculates the threshold value $\eta_{th}(s_n)$ of the lateral differential at the travel path distance $s_n$ of the other vehicle n, by Expression (1) using an optimized coefficient A. The ECU 24 then uses the lateral differential $\eta_n$ and the lateral differential threshold value $\eta_{th}(s_n)$ of the other vehicle n to determine whether or not the determination condition in Expression (3) is satisfied. The processing thereafter is similar to that performed by the ECU 21 relating to the first embodiment, and therefore description thereof is omitted here.

Figure 10:
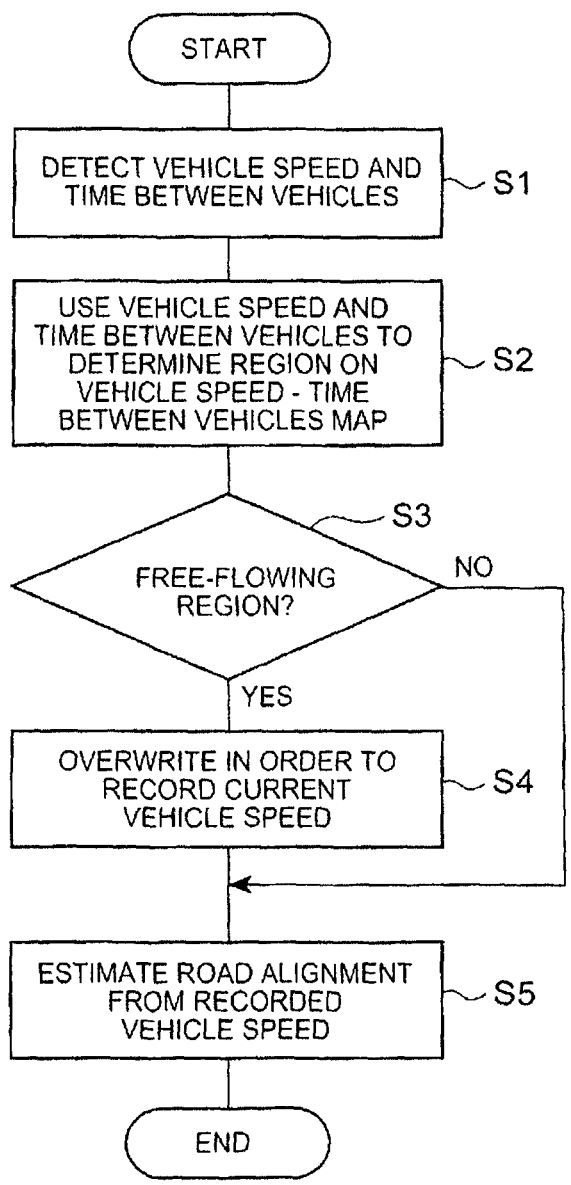
FIG. 10 is a flowchart showing a flow of operations in a road alignment estimation relating to the fourth embodiment.

The operation of the vehicle location estimation apparatus 4 having the composition described above will now be explained. Here, the operation relating to the estimation of the road alignment is described with reference to the flowchart in FIG. 10. FIG. 10 is a flowchart showing the flow of an operation for estimating the road alignment. In the vehicle location estimation apparatus 4, the operations indicated below are carried out repeatedly. The operation of the other vehicle n is similar to the operation described in the first embodiment, and description thereof is omitted here. Furthermore, the various operations of the vehicle-to-vehicle communications apparatus 10, the GPS receiver apparatus 11, the azimuth sensor 12 and the yaw rate sensor 13 are similar to the operations described in the first embodiment, and therefore are not described here.

The vehicle speed sensor 14 detects the speed of the host vehicle and transmits this to the ECU 24 (S1). The ECU 24 acquires the vehicle speed (S1). Furthermore, the radar sensor 16 transmits an electromagnetic wave in front of the host vehicle, while scanning in the left/right direction, receives the reflected wave, and determines whether or not there is a vehicle in front situated within the radar detection range, on the basis of the presence or absence of information for reflected points, and the like. Upon determining that there is a vehicle in front, the radar sensor 16 calculates the relative distance to the vehicle in front, and the like and transmits this detection result to the ECU 24 (S1). The ECU 24 acquires the detection results (presence/absence of vehicle in front, relative distance (distance between vehicles), etc.) from the radar sensor 16 (S1). The ECU 24 uses the speed of the host vehicle and the relative distance to the vehicle in front (distance between vehicles) to calculate the time between vehicles with respect to the vehicle in front (S1).

For each of the other vehicles n, the ECU 24 determines whether the other vehicle n is in front of or in the rear of the host vehicle. When the other vehicle n is in the rear of the host vehicle, then the ECU 24 determines whether or not the course on which the other vehicle n is travelling is the same as the course on which the host vehicle is travelling by a process similar to that described in the second embodiment.

If the other vehicle n is in front of the host vehicle, then the ECU 24 uses the speed of the host vehicle and the time between vehicles with respect to the vehicle in front to determine whether or not the host vehicle is in the free flow region of the vehicle speed-time between vehicles map (S2), and determines whether or not the vehicle is in a free flow region (S3). If the vehicle is determined to be in a free flow region in S3, then the ECU 24 overwrites and records the current vehicle speed (S4).

The ECU 24 then estimates the road alignment by setting the coefficient A in Expression (1) on the basis of the recorded vehicle speed (S5). Therefore, when it is determined that the host vehicle is in a free flow region in S3, the host vehicle is judged to be traveling in free flowing traffic, and therefore the coefficient A is set by taking the vehicle speed at that time to be a speed suited to the road alignment. On the other hand, when it is determined that the vehicle is not in a free flow region in S3, the host vehicle is judged not to be traveling in free flowing traffic (congested traffic or traffic jam), and therefore, rather than setting the vehicle speed in this case as a vehicle speed suited to the road alignment, the coefficient A is set on the basis of the vehicle speed when the vehicle was last in free flowing traffic. The ECU 24 determines whether or not the course on which the other vehicle n is traveling is the same as the course on which the host vehicle is traveling, by a similar process to that described in the first embodiment, by using Expression (1) in which this value of the coefficient A has been set.

The respective operations of the ECU 24 and the display apparatus 30 after completing determination in respect of all of the other vehicles n conducting vehicle-to-vehicle communications are similar to the operations described in the first embodiment, and therefore description thereof is omitted here.

The vehicle location estimation apparatus 4 has the following beneficial effects in addition to having similar beneficial effects to the vehicle location estimation apparatus 2 relating to the second embodiment. According to the vehicle location estimation apparatus 4, by using a road alignment suited to the vehicle speed when the vehicle is traveling in free flowing traffic, it is possible at least to set the coefficient A for Expression (1) to a suitable value on the basis of the road alignment corresponding to the vehicle speed. Therefore, the same-course determination range can be set with high accuracy, and the accuracy of same-course determination can be improved. In particular, it is possible to prevent the same-course determination range from broadening, the longer the travel path distance.

Furthermore, according to the vehicle location estimation apparatus 4, the vehicle speed during travel in free flowing traffic is recorded, and even if the vehicle is not traveling in free flowing traffic, by using a road alignment corresponding to the vehicle speed when the vehicle was last traveling in free flowing traffic, it is possible to set the same-course determination range with high accuracy, and the accuracy of same-course determination can be improved. Furthermore, according to the vehicle location estimation apparatus 4, it can be determined, simply and accurately, whether or not the host vehicle is traveling in free flowing traffic, from the speed of the host vehicle and the time between vehicles with respect to the vehicle in front.

Figure 11:
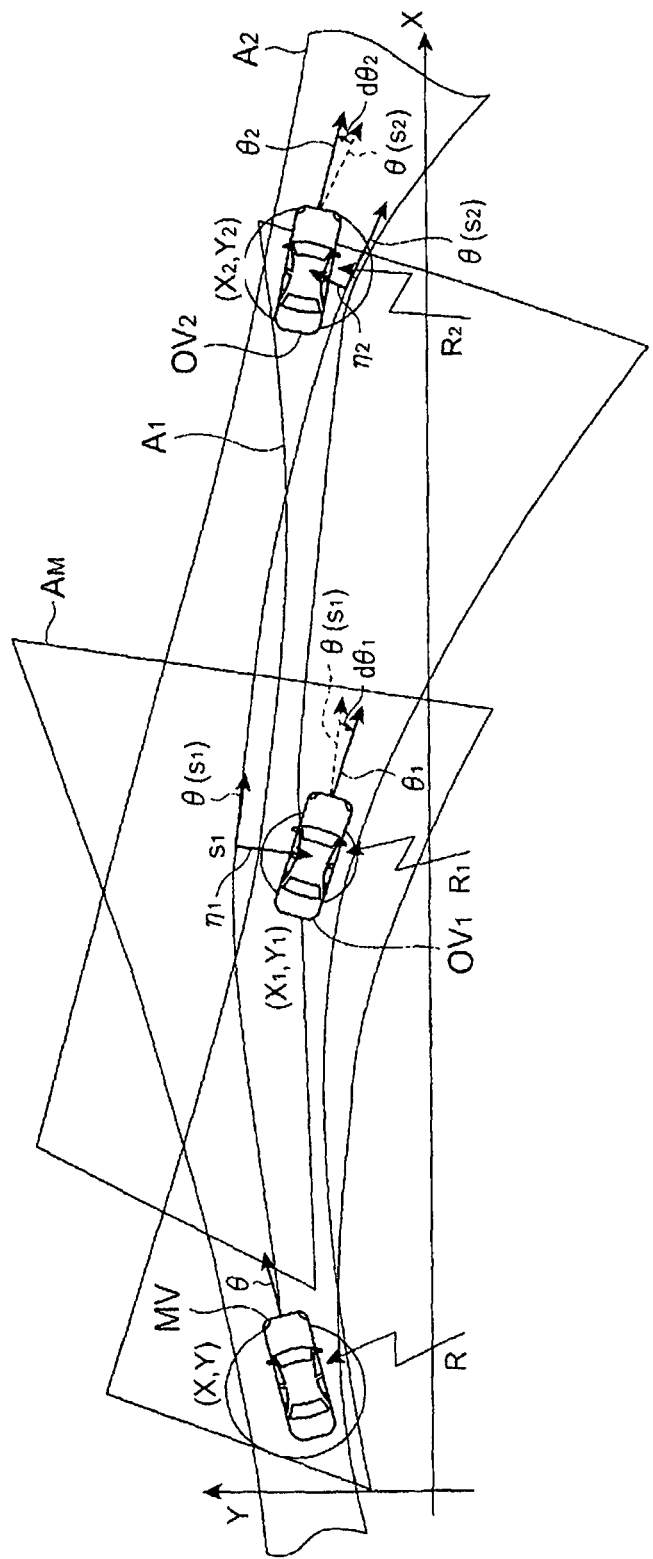
FIG. 11 is an illustrative drawing of a same-course determination method relating to the fifth embodiment.

The vehicle location estimation apparatus 5 relating to the fifth embodiment is now described with reference to FIGS. 1 and 11. FIG. 1 is a schematic drawing of the vehicle location estimation apparatus. FIG. 11 is an illustrative diagram of a same-course determination method.

Compared to the vehicle location estimation apparatus 1 relating to the first embodiment, the vehicle location estimation apparatus 5 determines whether or not the course on which another vehicle is traveling it the same as the course on which the host vehicle is traveling, by a different determination method to determination based on threshold values relating to the lateral differential and the azimuth. More specifically, the vehicle location estimation apparatus 5 respectively sets a same-course determination range for the host vehicle and a same-course determination range for the other vehicles, and determines that another vehicle having a large overlapping portion between the respective determination ranges is on the same course.

An overview of this same-course determination method is described here with reference to FIG. 11. In the example in FIG. 11, vehicle-to-vehicle communications are conducted with two other vehicles $OV_1$ and $OV_2$, and information is obtained from these other vehicles $OV_1$ and $OV_2$. The absolute location, the absolute azimuth, the yaw rate, the vehicle speed, the estimated road radius, and the like, can be acquired from the other vehicles, $OV_1$ and $OV_2$. FIG. 11 depicts an X-Y absolute coordinate system, but it is also possible to adopt an s-η relative coordinate system.

The same-course determination range $A_M$ of the host vehicle MV is obtained by Expression (1) described in the first embodiment, in respect of the front side of the host vehicle MV, and is obtained by Expression (5) described in the second embodiment, in respect of the rear side of the host vehicle MV. Since the various information can be acquired from the other vehicles $OV_1$ and $OV_2$, it is possible to obtain same-course determination ranges $A_1$ and $A_2$ for the other vehicles $OV_1$ and $OV_2$, in a similar fashion. In the host vehicle MV, the absolute location, absolute azimuth, yaw rate, vehicle speed and estimated road direction of each of the other vehicles $OV_1$ and $OV_2$, can be acquired. Therefore, it is also possible to determine the travel trajectories of the other vehicles $OV_1$ and $OV_2$, and to convert to s-η coordinate systems based on the other vehicles $OV_1$ and $OV_2$. Consequently, same-course determination ranges $A_1$ and $A_2$ can also be set with respect to each of the other vehicles $OV_1$ and $OV_2$.

If the host vehicle MV and the other vehicles $OV_1$ and $OV_2$ are on the same course, then there is a large overlapping portion between the same-course determination range $A_M$ of the host vehicle MV and the same-course determination ranges $A_1$ and $A_2$ of the other vehicles $OV_1$ and $OV_2$. Therefore, if there is a large overlapping portion (for example, surface area) between the same-course determination range $A_M$ of the host vehicle MV and the same-course determination ranges $A_1$ and $A_2$ of the other vehicles $OV_1$ and $OV_2$, then it is determined that the course on which the other vehicles $OV_1$ and $OV_2$ are the same as the course on which the host vehicle MV is travelling. In this case, by adjusting the threshold value at which the magnitude of the overlapping portion is determined, it is possible to determine not only if the course on which the other vehicle is travelling is the same as the course on which the host vehicle is travelling, but also if the other vehicle has the same direction of travel as the host vehicle. If the other vehicle is on the same course but has a different direction of travel, then the overlapping portion is small.

In the case of this determination method, a determination can be made by respectively finding the overlapping portions between the host vehicle and one other vehicle, or a determination can be made by finding the overlapping portion between the host vehicle and a plurality of other vehicles.

It is also possible to use the overlapping portion to limit the same-course determination range of the host vehicle MV, to use this limited same-course determination range to set the threshold value of the lateral differential, and to make a determination by a method similar to the first embodiment or a method similar to the second embodiment. By setting a range which is limited in this way, it is possible to improve the determination accuracy.

The vehicle location estimation apparatus 5 is provided with a vehicle-to-vehicle communications apparatus 10, a GPS receiver apparatus 11, an azimuth sensor 12, a yaw rate sensor 13, a vehicle speed sensor 14, an ECU 25, and a display apparatus 30. The yaw rate sensor 13, the vehicle speed sensor 14 and the ECU 25 of the fifth embodiment may be regarded as the road radius estimation device of the present invention, and the ECU 25 of the fifth embodiment may be regarded as the coordinate conversion device and the determination device of the present invention.

The ECU 25 is an ECU constituted by a CPU, a ROM, a RAM, and the like, and the ECU 25 implements overall control of the vehicle location estimation apparatus 5. Similarly to the ECU 21 relating to the first embodiment, at predetermined time intervals, the ECU 25 acquires information about the respective other vehicles n from the vehicle-to-vehicle communications apparatus 10, and also acquires various detection information from the GPS receiver apparatus 11, the azimuth sensor 12, the yaw rate sensor 13 and the vehicle speed sensor 14. Moreover, similarly to the ECU 21 relating to the first embodiment, at predetermined intervals, the ECU 25 sends information to the vehicle-to-vehicle communications apparatus 10, in order to transmit information about the host vehicle to the other vehicles by vehicle-to-vehicle communications. Furthermore, for each other vehicle n conducting vehicle-to-vehicle communications, the ECU 25 determines whether or not the other vehicle n is on the same course, by using the acquired information about the other vehicle and the information about the host vehicle, and outputs image information indicating another vehicle which is determined to be on the same course on the basis of this determination result, to the display apparatus 30. This same course determination process is described in detail below.

The ECU 25 uses the absolute location (X,Y), absolute azimuth θ and estimated road radius R of the host vehicle to calculate boundary lines for the range on both the left and right sides by Expression (1), in respect of the front side of the host vehicle, and uses the travel trajectory and the travel distance of the host vehicle to calculate boundary lines for the range on both the left and right sides by Expression (5), in respect of the rear side of the host vehicle, whereby a same-course determination range for the host vehicle is found. Furthermore, for each other vehicle n (n=1, 2, ... ), the ECU 25 uses the absolute location $(X_n,Y_n)$, absolute azimuth $θ_n$ and estimated road radius $R_n$ of the object vehicle n to calculate boundary lines for the range on both the left and right sides by Expression (1), in respect of the front side of the other vehicle n, and uses the travel trajectory and the travel distance of the other vehicle n to calculate boundary lines for the range on both the left and right sides by Expression (5), in respect of the rear side of the other vehicle n, whereby a same-course determination range for the other vehicle n is found.

For each of the other vehicles n (n=1, 2, ... ), the ECU 25 calculates the surface area of the overlapping portion between the same-course determination range of the host vehicle and the same-course determination range of the other vehicle n. The ECU 25 then determines whether or not the surface area of the overlapping portion is greater than a surface area determination threshold value. This surface area determination threshold value is set in advance by real vehicle experimentation, or the like. The ECU 25 determines that the course on which the other vehicle n is travelling is the same as the course on which the host vehicle is travelling if the surface area of the overlapping portion is greater than the surface area judgment threshold value. The ECU 25 determines that the course on which the other vehicle n is travelling is not the same as the course on which the host vehicle is traveling if the surface area of the overlapping portion is equal to or less than the surface area judgment threshold value. Upon completing the determination described above in respect of all of the other vehicles n conducting vehicle-to-vehicle communications, the ECU 25 generates an image in which other vehicles which have been determined to be on the same course as the course on which the host vehicle are positioned relatively with respect to the host vehicle. The ECU 25 outputs this image information to the display apparatus 30.

The ECU 25 uses dead reckoning based on the yaw rate γ and the vehicle speed V of the host vehicle or the absolute location (X,Y) based on the GPS to find the travel trajectory of the host vehicle, as well as finding the travel distance along the travel trajectory. The ECU 25 holds this data about the travel trajectory and the travel distance of the host vehicle for a prescribed amount of time or for a prescribed distance. For each other vehicle n, the ECU 25 also uses dead reckoning based on the yaw rate $\gamma_n$ and the vehicle speed $V_n$ of the other vehicle n or the absolute location $(X_n, Y_n)$ based on the GPS to find the travel trajectory of the other vehicle, as well as finding the travel distance along the travel trajectory. The ECU 25 holds this data about the travel trajectory and the travel distance of the other vehicle n for a prescribed amount of time or for a prescribed distance.

The operation of the vehicle location estimation apparatus 5 having the composition described above will now be explained. In the vehicle location estimation apparatus 5, the operations indicated below are carried out repeatedly. The operation of the other vehicle n is similar to the operation described in the first embodiment, and description thereof is omitted here. Furthermore, the various operations of the vehicle-to-vehicle communications apparatus 10, the GPS receiver apparatus 11, the azimuth sensor 12, the yaw rate sensor 13 and the vehicle speed sensor 14 are similar to the operations described in the first embodiment, and are therefore not described here. The ECU 25 finds and saves the travel trajectory, and the travel distance along the travel trajectory, each time the yaw rate and the vehicle speed (or the absolute location) of the host vehicle are acquired. Furthermore, for each other vehicle n, the ECU 25 finds and saves the travel trajectory, and the travel distance along the travel trajectory, each time the yaw rate and the vehicle speed (or the absolute location) of the other vehicle n are acquired.

The ECU 25 uses the absolute location (X,Y), absolute azimuth θ and estimated road radius R of the host vehicle to calculate boundary lines for both the left and right sides of the same-course determination range, in respect of the front side of the host vehicle, and uses the travel trajectory and the travel distance of the host vehicle to calculate boundary lines for both the left and right sides of the same-course determination range, in respect of the rear side of the host vehicle, whereby a same-course determination range for the host vehicle is found. Furthermore, for each other vehicle n (n=1, 2, . . . ), the ECU 25 uses the absolute location $(X_n, Y_n)$, absolute azimuth $\theta_n$ and estimated road radius $R_n$ of the other vehicle to calculate boundary lines for both the left and right sides of the same-course determination range, in respect of the front side of the other vehicle n, and uses the travel trajectory and the travel distance of the object vehicle n to calculate boundary lines for both the left and right sides of the same-course determination range in respect of the rear side of the other vehicle n, whereby a same-course determination range for the other vehicle n is found.

For each other vehicle n, the ECU 25 calculates the surface area of the overlapping portion between the same-course determination range of the host vehicle and the same-course determination range of the other vehicle n, and judges whether or not the surface area of the overlapping portion is larger than the surface area determination threshold value. The ECU 25 determines that the course on which the other vehicle n is travelling is the same as the course on which the host vehicle is travelling if the surface area of the overlapping section is greater than the surface area determination threshold value, and determines that the course on which the other vehicle n is not the same as the course on which the host vehicle is travelling if the surface area of the overlapping portion is equal to or less than the surface area judgment threshold value.

The respective operations of the ECU 25 and the display apparatus 30 after completing determination in respect of all of the other vehicles n conducting vehicle-to-vehicle communications are similar to the operations described in the first embodiment, and therefore description thereof is omitted here.

This vehicle location estimation apparatus 5 finds a same-course determination range for the host vehicle and a same-course determination range for the other vehicles, and determines the size of the overlapping portions between these ranges, thereby determining, with high accuracy, whether or not the course on which another vehicle is travelling is the same as the course on which the host vehicle is travelling, with simple equipment. In particular, it is possible to improve the same-course determination accuracy, by using the same-course determination ranges for a plurality of other vehicles.

Embodiments of the invention have been described above, but the invention is not limited to the embodiments given above and can be implemented in various modes.

For example, in the embodiments, other vehicles on the same course are determined from among other vehicles conducting vehicle-to-vehicle communications, and these other vehicles on the same course are displayed, but it is also possible to present determination results of the same-course determination to a driving assistance apparatus (for example, a PCS, cooperative-adaptive cruise control (CACC)), or the like, and to use this for various control procedures.

Furthermore, in the embodiments, the object of the same-course determination is another vehicle which is traveling in the same direction on the same road as the host vehicle; however, reduction in the sensor error and the movement error, and the like reduces the threshold values and thus raises the accuracy, whereby the object of the same-course determination can be another vehicle which is traveling in the same direction and in the same lane as the host vehicle.

Moreover, in the embodiments, the absolute location and the absolute azimuth are detected as the location and azimuth of each vehicle, but the relative location and the relative azimuth may also be detected by using radar, a camera, and the like. In this case, there is no need to convert from an absolute coordinate system to a relative coordinate system based on the host vehicle, and the other vehicles can be shown on a relative coordinate system based on the host vehicle, using the relative locations and the relative azimuths. Moreover, in this case, since there is no need to acquire information about the other vehicles by vehicle-to-vehicle communications, then other vehicles which do not have a vehicle-to-vehicle communications function can also be set as a determination object. Even when another vehicle in front of the host vehicle has been detected by radar, or the like, if there is a turn-off point in front, then that other vehicle may not be on the same course as the course on which the host vehicle is travelling.

Furthermore, in the embodiments, the azimuth is acquired by being detected by a sensor, but it may also be acquired by another method; for example, the azimuth may be acquired by calculation from time series data of the absolute location according to the GPS.

Furthermore, in the embodiments, the radius (curvature) of the road during travel is estimated by calculation from the yaw rate and the vehicle speed, but it is also possible to estimate the radius of the road by another method; for example, a lane can be detected from an image captured by a camera, and the road radius can be estimated by calculating the radius of the lane.

Moreover, in the embodiments, it is judged whether or not the host vehicle is traveling in free flowing traffic from the actual vehicle speed and the time between vehicles, by referring to a vehicle speed-time between vehicles map, but this judgment can also be made by other method. For instance, traffic jam information can be acquired by vehicle-to-vehicle communications, and a judgment can be made from this traffic jam information. Furthermore, in the embodiments, a vehicle in front was detected by a radar sensor, but a vehicle in front may also be detected by other device. For example, a vehicle in front is detected by using a stereo camera, or detection information for a vehicle in front supplied from another apparatus, such as an ACC, is used.

In this vehicle location estimation apparatus, as well as acquiring the azimuth of the direction of travel of the host vehicle by the azimuth acquisition device, the radius of the road on which the host vehicle is traveling (including the curvature of the road) is estimated by the road radius estimation device. Furthermore, in the vehicle location estimation apparatus, the location of the other vehicle is acquired by the other vehicle location acquisition device, and the azimuth of the other vehicle is acquired by the other vehicle azimuth acquisition device. In the vehicle location estimation apparatus, the azimuth of the direction of travel of the host vehicle and the estimated road radius are used to create a coordinate system, an origin of which is the host vehicle, and an axis of which is the estimated road radius in the direction of travel of the host vehicle, and the location and azimuth of the other vehicle are used to arrange the other vehicle on this coordinate system. Consequently, the lateral locational deviation and the azimuth deviation of the other vehicle with respect to the course being travelled by the host vehicle can be identified by arranging the other vehicle on a coordinate system in the travel path direction of the course being travelled by the host vehicle. When determining whether or not the course on which the other vehicle is traveling is the same as the course on which the host vehicle is travelling, the conditions are that the lateral location of the other vehicle is inside the course range of the host vehicle, and that the direction of travel of the other vehicle is the same as the direction of travel of the host vehicle. When making this determination, it is possible to achieve a determination of high accuracy through stipulating a course range by taking account of the width of the course, the location and azimuth detection error, error in the estimation of the road radius, vehicle driving error (in actual travel of the vehicle, the vehicle deviates, whether driving on a straight road or a curve, and therefore error occurs in the azimuth and the estimated road radius due to the deviation of the vehicle itself), change in the curvature of the course (on an actual road, the road radius is often non-uniform, and the curvature changes as a clothoid curve). Therefore, in the vehicle location estimation apparatus, it is determined by the determination device whether or not the course on which the other vehicle is travelling is the same as the course on which the host vehicle is travelling, by taking account of the course width, location error, azimuth error, error in the estimated road radius, error due to vehicle deviation, and change in the curvature of the course, in respect of lateral location deviation and azimuth deviation of the other vehicle in the abovementioned coordinate system. In this same-course determination, there is no need for a map or a high-precision location of the other vehicle (a location detection device, such as a global positioning system (GPS) receiver apparatus, radar, or the like, which is conventionally installed in a vehicle is sufficient), and there is no need for the travel trajectories of the other vehicles either. Moreover, an empirical map suited to the travel scenario and the installed sensors, and the like, is not required, and it is possible to adapt readily even if the travel scenarios and installed sensors, and the like, are changed. In this way, in the vehicle location estimation apparatus, it is possible to accurately determine whether or not the course on which other vehicles are travelling is the same as the course on which the host vehicle is travelling, by means of simple equipment, by using a coordinate system, an origin of which is the host vehicle, and an axis of which is the estimated road radius in the direction of travel of the host vehicle, and determining whether the course on which the other vehicle is travelling is the same as the course on which the host vehicle is travelling by taking account of the width of the course, sensor error, azimuth error, error in the estimated road radius, error due to deviation of the vehicle, and change in the curvature of the course.

The object of the same-course determination is another vehicle which is traveling in the same direction on the same road as the host vehicle. By increasing the determination accuracy, it is possible to make the determination object another vehicle which traveling in the same direction and in the same lane as the host vehicle. The other vehicle information may be absolute information or may be relative information with reference to the host vehicle.

In this vehicle location estimation apparatus, the trajectory already travelled by the host vehicle is acquired by the travel trajectory acquisition device, and the travel distance along this travel trajectory is acquired by the travel distance acquisition device. Since there is a record (travel trajectory) which has already been travelled on the rear side of the host vehicle, then by using this travel record, it is possible to narrow the range of the course in relation to another vehicle in the rear of the host vehicle. Furthermore, in the vehicle location estimation apparatus, the travel trajectory and the travel distance of the host vehicle are used to create a coordinate system, an origin of which is the host vehicle, and an axis of which is the travel trajectory in the rear of the host vehicle, and the location and azimuth of the other vehicle are used to arrange the other vehicle on this coordinate system. In this way, another vehicle on the rear side is arranged on a coordinate system along the travel trajectory (history) of the host vehicle, and the lateral location deviation and azimuth deviation with respect to the trajectory (course) already travelled by the host vehicle are identified. When determining whether or not the course on which the other vehicle is traveling is the same as the course on which the host vehicle is travelling, the conditions are that the lateral location of the other vehicle in the rear side is inside the range of the course already travelled by the host vehicle (is not significantly distanced from the travel trajectory), and that the direction of travel of the other vehicle is the same as the direction of travel of the host vehicle. In making this determination, a determination of high accuracy can be achieved by stipulating a course range which takes account of the course width, the location detection error, and the drift error per travel distance on the travel trajectory. This course range only increases with the drift error per travel distance on the travel trajectory, and therefore the amount of increase is small, even if the travel path distance (travel distance) is large. Therefore, in the vehicle location estimation apparatus, it is determined by the determination device whether or not the course on which the other vehicle is traveling is the same as the course on which the host vehicle is travelling, by taking account of the course width, location error and drift error per travel distance on the travel trajectory, in respect of lateral location deviation and azimuth deviation of the other vehicle in the abovementioned coordinate system. In this way, according to the vehicle location estimation apparatus, in the case of another vehicle in the rear of the host vehicle, it is possible to suppress broadening of the same-course determination range, the greater the travel path distance (the further the distance to the other vehicle), by using a coordinate system, an origin of which is the host vehicle, and an axis of which is the travel trajectory to the rear of the host vehicle, and determining whether or not the course on which the other vehicle is travelling is the same as the course on which the host vehicle is travelling by taking account of the course width, the location error, and the drift error per travel distance on the travel trajectory, and therefore the same-course determination accuracy can be improved.

This vehicle location estimation apparatus sets another vehicle performing vehicle-to-vehicle communications as a determination object. In this vehicle location estimation apparatus, the absolute location of the host vehicle is detected by the location detection device and the absolute azimuth of the host vehicle is acquired by the azimuth acquisition device. In the other vehicle conducting vehicle-to-vehicle communications, the absolute location and absolute azimuth are detected and this information is transmitted by vehicle-to-vehicle communications. In the vehicle location estimation apparatus, the absolute location of the other vehicle is acquired by vehicle-to-vehicle communications by the other vehicle location acquisition device and the absolute azimuth of the other vehicle is acquired by vehicle-to-vehicle communications by the other vehicle azimuth acquisition device. In the vehicle location estimation apparatus, the absolute coordinate system is converted by the coordinate conversion device to a relative coordinate system based on the host vehicle (a coordinate system, an origin of which is a position of the host vehicle, and an axis of which is the estimated road radius in the direction of travel of the host vehicle, or a coordinate system, an origin of which is the host vehicle, and an axis of which is the travel trajectory in the rear of the host vehicle), and the absolute location and absolute azimuth of the other vehicle are used to arrange the other vehicle on this coordinate system. In the vehicle location estimation apparatus, the determination described above is then carried out by the determination device. In this way, in the vehicle location estimation apparatus, absolute information is acquired from the other vehicle by vehicle-to-vehicle communications, the absolute location and absolute azimuth of the host vehicle and the other vehicle are used to convert to a relative coordinate system based on the host vehicle, and it can be determined whether or not another vehicle conducting vehicle-to-vehicle communications is on the same course as the host vehicle, by simple equipment.

In the vehicle location estimation apparatus, an image of the periphery of the host vehicle is captured by the camera (an image in front of the host vehicle or in the rear of the host vehicle, etc.) and the lane in which the host vehicle is traveling is detected from the captured image by the lane detection device. Moreover, in the vehicle location estimation apparatus, the curvature of the lane is calculated by the curvature calculation device, and the change in the curvature of the lane is calculated by the curvature change calculation device. The curvature of the lane may be the radius of the lane. In this way, when the curvature and change in curvature of the lane being travelled is obtained by lane recognition by a camera, this information can be used for setting the change of the curvature of the course, and the like, with high accuracy in accordance with the circumstances of the actual course (lane), even if there is no map (road data). Therefore, in the vehicle location estimation apparatus, the curvature and change in curvature of the lane are used to set the change in curvature of the course, and the like, and the determination described above is carried out by the determination device. In this way, in this vehicle location estimation apparatus, by using the curvature and change in curvature of the lane obtained by lane recognition by a camera, it is possible to stipulate the course determination range with high accuracy, and a restricted range of error, and the accuracy of same-course determination can be improved.

In the vehicle location estimation apparatus, the vehicle speed of the host vehicle is detected by the vehicle speed detection device. Since there is a high correlation between the vehicle speed and the category of road, when the vehicle is traveling in free flowing traffic (when the host vehicle is traveling freely without being affected by other vehicles peripheral to the host vehicle, on a road which is free from congestion and traffic jams), then if the vehicle is traveling in free flowing traffic, the road alignment (for example, the number of lanes, course width, easement parameters, easement curve length) can be estimated in accordance with the vehicle speed at that time. Therefore, in the vehicle location estimation apparatus, it is judged whether or not the host vehicle is traveling in free flowing traffic, by the free flow judgment device, and the road alignment corresponding to the vehicle speed when traveling in free flowing traffic is estimated by the road alignment estimation device. By using this road alignment, it is possible to set the change in curvature of the road, and the like, with great accuracy, in accordance with the actual circumstances of the road, even if there is no map (road data). In the vehicle location estimation apparatus, the road alignment corresponding to the vehicle speed when traveling in free flowing traffic is used to set the change in curvature of the course, and the like, and the determination described above is carried out by the determination device. In this way, in the vehicle location estimation apparatus, it is possible to stipulate the determination range of the course with high accuracy and a restricted, range of error, and to improve the same-course determination accuracy, by using the road alignment corresponding to the vehicle speed when traveling in free flowing traffic.

In this vehicle location estimation apparatus, each time the free flow judgment device judges the host vehicle to be traveling in free flowing traffic, the road alignment estimation device records the vehicle speed detected by the vehicle speed detection device. If the vehicle is not traveling in free flowing traffic (in the case of congestion or a traffic jam), then there is no correlation between the vehicle speed and the category of road, and therefore it is not possible to estimate the road alignment corresponding to the vehicle speed. In the vehicle location estimation apparatus, if the free flow judgment device judges that the host vehicle is not traveling in free flowing traffic, then the road alignment estimation device estimates a road alignment corresponding to the vehicle speed recorded the last time that the free flow judgment device judged the host vehicle to be traveling in free flowing traffic. In the vehicle location estimation apparatus, the road alignment corresponding to the vehicle speed when last traveling in free flowing traffic is used to set the change in curvature of the course, and the like, and the determination described above is carried out by the determination device. In this way, in the vehicle location estimation apparatus, even if the host vehicle is not traveling in free flowing traffic, it is possible to improve the same-course determination accuracy by using the road alignment corresponding to the vehicle speed when the host vehicle was last traveling in free flowing traffic.

It is commonly recognized that free flowing traffic means a state where the vehicle speed is high and the time between vehicles is long. Consequently, in the vehicle location estimation apparatus, it can be determined, simply and accurately, whether or not the host vehicle is traveling in free flowing traffic, from the speed of the host vehicle and the time between vehicles with respect to the vehicle in front.

In this vehicle location estimation apparatus, when stipulating the course range of the host vehicle as described above, the determination device sets a threshold value for the location (and in particular, the lateral location), and a threshold value for the azimuth, corresponding to the travel path distance of the other vehicle, on the basis of this course range. In the vehicle location estimation apparatus, the determination device determines whether or not the course on which the other vehicle is traveling is the same as the course, on which the host vehicle is travelling by comparing the location (and in particular, the lateral location deviation) of the other vehicle, with the location threshold value, and by comparing the azimuth (and in particular, the azimuth deviation) of the other vehicle with the azimuth threshold value. In this way, in the vehicle location estimation apparatus, it is possible to determine whether or not the course on which the other vehicle is travelling is the same as the course on which the host vehicle is travelling by setting a location threshold value and an azimuth threshold value.

In the vehicle location estimation apparatus, as well as setting the course range of the host vehicle as described above, the determination device also sets the course range of the other vehicle which is the determination object, by a similar method. In the vehicle location estimation apparatus, the determination device finds the overlapping range between the course range of the host vehicle and the course range of the other vehicle, and determines whether or not the course on which the other vehicle is travelling is the same as the course on which the host vehicle is travelling, on the basis of this overlapping range. In this way, in the vehicle location estimation apparatus, it is possible to determine whether or not the course on which the other vehicle is travelling is the same as the course on which the host vehicle, is travelling, by finding the overlapping range where the course range of the host vehicle and the course range of the other vehicle are mutually overlapping.

In the vehicle location estimation apparatus, as well as setting the course range of the host vehicle as described above, the determination device also respectively sets the course range of the other vehicles which are the determination object. In the vehicle location estimation apparatus, the determination device finds the overlapping range between the course range of the host vehicle and the course range of the plurality of other vehicles, and determines whether or not the course on which the other vehicle is traveling is the same as the course on which the host vehicle is travelling, on the basis of this overlapping range. In this way, in the vehicle location estimation apparatus, it is possible to improve the accuracy of same-course determination, by also using the course ranges of a plurality of other vehicles.

According to the invention, it is possible to determine whether or not the course on which another vehicle is travelling is the same as the course on which the host vehicle is travelling, by means of simple equipment, by using a coordinate system, an origin of which is the host vehicle, and an axis of which is the estimated road radius in the direction of travel of the host vehicle, and determining whether the course on which the other vehicle is travelling is the same as the course on which the host vehicle is travelling by taking account of the width of the course, location error, azimuth error, error in the estimated road radius, error due to drift of the vehicle, and change in the curvature of the course.

The invention claimed is:

1. A vehicle location estimation apparatus for estimating a location of an other vehicle in the periphery of a host vehicle, the vehicle location estimation apparatus comprising:
an azimuth sensor configured to acquire an azimuth of a direction of travel of the host vehicle;
a receiver configured to:
receive the location of the other vehicle, and
receive an azimuth of a travel path direction in which the other vehicle is travelling; and
an ECU configured to:
estimate a curvature radius of a road on which the host vehicle is traveling;
arrange the other vehicle on a coordinate system, an origin of which is a position of the host vehicle, and an axis of which is the direction of travel in which the host vehicle is travelling, and
determine a lane on which the other vehicle is travelling, a lane on which the host vehicle is travelling, the travel path direction in which the other vehicle, and the travel path direction in which the host vehicle is travelling, by taking account at least one from among a width of the road, error in the received location of the other vehicle, error in the estimated curvature radius of the road, change in a curvature of the direction of travel of the host vehicle, azimuth error of the host vehicle and the other vehicle, error in an azimuth and a curvature radius of the direction of travel of the host vehicle due to drift of the host vehicle and the other vehicle,
set a location threshold value and an azimuth threshold value, and
determine whether or not the lane on which the other vehicle is traveling is the same as the lane on which the host vehicle is travelling and the travel path direction in which the other vehicle is travelling is the same as the direction of travel in which the host vehicle is travelling, by comparing the location of the other vehicle with the location threshold value, and also comparing the azimuth of the other vehicle with the azimuth threshold value.

2. The vehicle location estimation apparatus according to claim 1, wherein the ECU is further configured to:
acquire a travel trajectory of the host vehicle; and
acquire a travel distance of the host vehicle along the travel trajectory of the host vehicle,
determine if the other vehicle is travelling in the rear of the host vehicle,
arrange, in response to determining whether or not the lane on which the other vehicle in the rear of the host vehicle is travelling is the same as the lane on which the host vehicle is travelling and the travel path direction in which the other vehicle is travelling is the same as the travel path direction in which the host vehicle is travelling, the other vehicle in the rear of the host vehicle on a coordinate system, an origin of which is a position of the host vehicle, and an axis of which is the travel trajectory of the host vehicle in the rear of the host vehicle; and
determine whether or not the lane on which the other vehicle is travelling in the rear is the same as the lane on which the host vehicle is travelling and the travel path direction in which the other vehicle is travelling is the same as the travel path direction in which the host vehicle is travelling, by taking account of at least on from among the width of the road, error in the received location of the other vehicle, and drift error per travel distance on the travel trajectory.

3. The vehicle location estimation apparatus according to claim 1, further comprising:
a GPS configured to detect an absolute location of the host vehicle, wherein the ECU is further configured to:
implement conversion from a coordinate system based on the absolute location to a relative coordinate system, the origin of which is the position of the host vehicle, wherein
an object of same-course determination is an other vehicle which is in vehicle-to-vehicle communications with the host vehicle;
acquire the absolute azimuth of the host vehicle;
acquire the absolute location of the other vehicle by vehicle-to-vehicle communications;
acquire the absolute azimuth of the other vehicle by vehicle-to-vehicle communications; and
convert the absolute location and the absolute azimuth of the other vehicle to the relative coordinate system, an origin of which is the position of the host vehicle.

4. The vehicle location estimation apparatus according to claim 1, further comprising:
a camera configured to capture an image of the periphery of the host vehicle, wherein the ECU is further configured to:
detect a lane in which the host vehicle is traveling on the basis of the image captured by the camera;
calculate a curvature of the detected lane;
calculate a change in the calculated curvature; and
determine whether or not the lane on which the other vehicle is travelling is the same as the lane on which the host vehicle is travelling and the travel path direction in which the other vehicle is travelling is the same as the travel path direction in which the host vehicle is travelling, by using the calculated curvature and the change in the calculated curvature.

5. The vehicle location estimation apparatus according to claim 1, further comprising:
a vehicle speed sensor configured to detect a speed of the host vehicle, wherein the ECU is further configured to:
judge whether or not the host vehicle is traveling in free flowing traffic;
estimate a road alignment corresponding to the detected vehicle speed, in response to a determination that the host vehicle is traveling in free flowing traffic; and
determine whether or not a the lane on which the other vehicle travels is the same as the lane on which the host vehicle travels and the travel path direction in which the other vehicle is travelling is the same as the travel path direction in which the host vehicle is travelling, by using the estimated road alignment.

6. The vehicle location estimation apparatus according to claim 5, wherein the ECU is further configured to:
record the vehicle speed the host vehicle is traveling in free flowing traffic; and
estimate the road alignment corresponding to the vehicle speed recorded the last time that the host vehicle was judged to be traveling in free flowing traffic, in response to the ECU judging that the host vehicle is not traveling in free flowing traffic.

7. The vehicle location estimation apparatus according to claim 5, wherein the ECU is further configured to:

acquire a time between the host vehicle and the other vehicle traveling in front of the host vehicle; and
judge whether or not the host vehicle is traveling in free flowing traffic on the basis of the detected vehicle speed and the acquired time between vehicles.

8. The vehicle location estimation apparatus according to claim 1, wherein the ECU is further configured to control the host vehicle to avoid the other vehicle based on the determination of the travel path direction of the other vehicle.

9. A vehicle location estimation method for estimating a location of an other vehicle in the periphery of a host vehicle,
the vehicle location estimation method comprising:
acquiring an azimuth of the travel path direction of the host vehicle;
estimating a curvature radius of a road on which the host vehicle is traveling;
receiving the location of the other vehicle;
receiving an azimuth of the direction of travel of the other vehicle;
arranging the other vehicle on a coordinate system, an origin of which is a position of the host vehicle, and an axis of which is the travel path direction in which the host vehicle is travelling;
determining a lane on which the other vehicle is travelling, a lane on which the host vehicle is travelling, the direction of travel in which the other vehicle is travelling, and the travel path direction in which the host vehicle is travelling, by taking account at least one from among a width of a road, error in the received location of the other vehicle, error in the estimated curvature radius of the road, change in a curvature of the travel path direction of the host vehicle along the travel course, azimuth error of the host vehicle and the other vehicle, error in an azimuth, and a curvature radius of the travel path direction of the host vehicle due to drift of the host vehicle and the other vehicle; and
setting a location threshold value and an azimuth threshold value,
wherein the determining step determining whether or not the lane on which the other vehicle is traveling is the same as the lane on which the host vehicle is travelling and the travel path direction in which the other vehicle is travelling is the same as the direction of travel in which the host vehicle is travelling, by comparing the location of the other vehicle with the location threshold value, and also comparing the azimuth of the other vehicle with the azimuth threshold value.

10. A vehicle location estimation apparatus for estimating a location of an other vehicle in the periphery of a host vehicle,
the vehicle location estimation apparatus comprising:
an azimuth sensor configured to acquire an azimuth of a direction of travel of the host vehicle;
a receiver configured to:
receive the location of the other vehicle, and
receive an azimuth of a travel path direction in which the other vehicle is travelling; and
an ECU configured to:
estimate a curvature radius of a road on which the host vehicle is traveling;
arrange the other vehicle on a coordinate system, an origin of which is a position of the host vehicle, and an axis of which is the travel path direction of the travel of the host vehicle;
determine a lane on which the other vehicle is travelling, a lane on which the host vehicle is travelling, the travel path direction in which the other vehicle is travelling, and the direction of travel in which the host vehicle is travelling, by taking account at least one from among a width of a road, error in the received location of the other vehicle, error in the estimated curvature radius of the road, change in a curvature of a travel course of the host vehicle along the travel course, azimuth error of the host vehicle and the other vehicle, error in an azimuth, and a curvature radius of the travel path direction of the host vehicle due to drift of the host vehicle and the other vehicle;

set a range of a travel course of the host vehicle and a range of a travel course of the other vehicle; and determine whether or not the lane on which other vehicle is travelling is the same as the lane on which the host vehicle is travelling and the travel path direction in which the other vehicle is travelling is the same as the direction of travel in which the host vehicle is travelling, on the basis of an overlapping range between the course range of the host vehicle and the course range of the other vehicle.

11. The vehicle location estimation apparatus according to claim 10, wherein the ECU is further configured to:
acquire a travel trajectory of the host vehicle;
acquire a travel distance of the host vehicle along the travel trajectory of the host vehicle;
determine if the other vehicle is travelling in the rear of the host vehicle,
arrange, in response to determining whether or not the lane on which the other vehicle in the rear of the host vehicle is travelling is the same as the lane on which the host vehicle is travelling, the other vehicle in the rear of the host vehicle on a coordinate system, an origin of which is a position of the host vehicle, and an axis of which is the travel trajectory of the host vehicle in the rear of the host vehicle; and
determine whether or not the lane on which the other vehicle is travelling in the rear is the same as the lane on which the host vehicle is travelling and the travel path direction in which the other vehicle is travelling is the same as the travel path direction in which the host vehicle is travelling, by taking account of the width of the road, error in the received location of the other vehicle, and drift error per travel distance on the travel trajectory.

12. The vehicle location estimation apparatus according to claim 10, further comprising:
a GPS configured to detect an absolute location of the host vehicle, wherein the ECU is further configured to:
implement conversion from a coordinate system based on the absolute location to a relative coordinate system, the origin of which is the position of the host vehicle, wherein
an object of same-course determination is an other vehicle which is in vehicle-to-vehicle communications with the host vehicle;
acquire the absolute azimuth of the host vehicle;
acquire the absolute location of the other vehicle by vehicle-to-vehicle communications;
acquire the absolute azimuth of the other vehicle by vehicle-to-vehicle communications; and
convert the absolute location and the absolute azimuth of the other vehicle to the relative coordinate system, an origin of which is the position of the host vehicle.

13. The vehicle location estimation apparatus according to claim 10, further comprising:
a camera configure to capture an image of the periphery of the host vehicle, wherein the ECU is further configured to:
detect a lane in which the host vehicle is traveling on the basis of the image captured by the camera;
calculate a curvature of the detected lane;
calculate change in the calculated curvature; and
determine whether or not the lane on which the other vehicle is travelling is the same as the lane on which the host vehicle is travelling and the travel path direction in which the other vehicle is travelling is the same as the travel path direction in which the host vehicle is travelling, by using the calculated curvature and the change in the calculated curvature.

14. The vehicle location estimation apparatus according to claim 10, further comprising:
a vehicle speed sensor configured to detect a speed of the host vehicle, wherein the ECU is further configured to:
judge whether or not the host vehicle is traveling in free flowing traffic;
estimate a road alignment corresponding to the detected vehicle speed in response to a determination that the host vehicle is traveling in free flowing traffic; and
determine whether or not the lane on which the other vehicle travels is the same as the lane on which the host vehicle travels and the travel path direction in which the other vehicle is travelling is the same as the travel path direction in which the host vehicle is travelling, by using the estimated road alignment.

15. The vehicle location estimation apparatus according to claim 14, wherein the ECU is further configured to:
record the vehicle speed each time the host vehicle is traveling in free flowing traffic; and
estimate the road alignment corresponding to the vehicle speed recorded the last time that the host vehicle was judged to be traveling in free flowing traffic, in response to the ECU judging that the host vehicle is not traveling in free flowing traffic.

16. The vehicle location estimation apparatus according to claim 14, wherein the ECU is further configured to:
acquire a time between the host vehicle and the other vehicle traveling in front of the host vehicle; and
judge whether or not the host vehicle is traveling in free flowing traffic on the basis of the detected vehicle speed and the acquired time between vehicles.

17. The vehicle location estimation apparatus according to claim 10, wherein the ECU is further configured to judge whether or not the other vehicle is on the same course as the host vehicle, by using course ranges of a plurality of other vehicles.

* * * * *